United States Patent
Wiltgen et al.

(10) Patent No.: US 11,454,273 B2
(45) Date of Patent: Sep. 27, 2022

(54) FASTENER SYSTEMS AND METHODS

(71) Applicant: Security Locknut, LLC, Vernon Hills, IL (US)

(72) Inventors: Raymond Thomas Wiltgen, Lake Geneva, WI (US); David Brian May, Scottsdale, AZ (US)

(73) Assignee: Security Locknut, LLC, Vernon Hills, IL (US)

( * ) Notice: Subject to any disclaimer, the term of this patent is extended or adjusted under 35 U.S.C. 154(b) by 94 days.

(21) Appl. No.: 16/163,783

(22) Filed: Oct. 18, 2018

(65) Prior Publication Data

US 2019/0120279 A1  Apr. 25, 2019

Related U.S. Application Data

(60) Provisional application No. 62/574,586, filed on Oct. 19, 2017.

(51) Int. Cl.
*F16B 39/10* (2006.01)
*F16B 43/00* (2006.01)
(Continued)

(52) U.S. Cl.
CPC .......... *F16B 39/105* (2013.01); *F16B 37/044* (2013.01); *F16B 37/045* (2013.01);
(Continued)

(58) Field of Classification Search
CPC ........ F16B 39/105; F16B 43/02; F16B 43/00; F16B 43/001; F16B 33/004; F16B 21/183;
(Continued)

(56) References Cited

U.S. PATENT DOCUMENTS 1,986,891 A * 1/1935 Green ............... F16B 39/34
411/233
3,399,589 A * 9/1968 Breed .............. F16B 33/004
411/428
(Continued)

FOREIGN PATENT DOCUMENTS

CN  201221543 Y  4/2009
JP  2000-320520 A  11/2000
(Continued)

OTHER PUBLICATIONS

"Mill Liner Bolt Tightening Procedure" by Donhad, 2 pages (at least as early as 2017).
(Continued)

*Primary Examiner* — Roberta S Delisle
(74) *Attorney, Agent, or Firm* — McDonnell Boehnen Hulbert & Berghoff LLP

(57) ABSTRACT

A system includes a washer, a nut, a retainer structure, and a gasket. The washer has a bore extending between a distal end and a proximal end. A first section of the bore extends from the distal end to a shoulder portion. A second section of the bore extends from the shoulder portion to the proximal end. The shoulder portion defines an aperture. The nut is configured to be received in the first section of the bore. The nut includes a threaded bore configured to threadably engage a threaded shaft of a bolt. The retainer structure is configured to axially retain the nut in the first section of the bore of the washer. The gasket has a through-bore axially aligned with the bore of the washer and the threaded bore of the nut. The gasket is configured to be axially retained in the second section of bore of the washer.

24 Claims, 17 Drawing Sheets

(51) Int. Cl.
*F16B 37/04* (2006.01)
*F16B 43/02* (2006.01)
*F16B 21/18* (2006.01)
*F16B 5/02* (2006.01)
*F16B 5/06* (2006.01)
*F16B 41/00* (2006.01)

(52) U.S. Cl.
CPC ............ *F16B 43/00* (2013.01); *F16B 43/001* (2013.01); *F16B 43/02* (2013.01); *F16B 5/02* (2013.01); *F16B 5/0642* (2013.01); *F16B 21/183* (2013.01); *F16B 41/002* (2013.01)

(58) Field of Classification Search
CPC ........ F16B 5/02; F16B 5/0642; F16B 37/044; F16B 37/045; F16B 39/10; F16B 41/002; Y10T 16/063
USPC ...................................................... 411/371.1
See application file for complete search history.

(56) References Cited

U.S. PATENT DOCUMENTS

| | | | | |
|---|---|---|---|---|
| 3,635,272 A * | 1/1972 | Scheffer | ................. | F16B 39/26 411/303 |
| 3,678,979 A * | 7/1972 | Bjorklumd | ........... | F16B 43/001 411/134 |
| 4,230,326 A * | 10/1980 | White | .................... | B02C 17/22 16/2.2 |
| 5,193,960 A * | 3/1993 | Fukushima | ........... | E21D 11/083 277/637 |
| 5,393,182 A * | 2/1995 | Berecz | ................. | F16B 33/004 411/369 |
| 5,454,675 A * | 10/1995 | DeHaitre | .............. | F16B 33/004 411/303 |
| 6,059,501 A * | 5/2000 | Van Dyke | ............... | F16B 39/24 411/160 |
| 6,918,726 B1 * | 7/2005 | Kerr | ........................ | F16B 39/34 411/247 |
| 7,597,517 B2 * | 10/2009 | Beeles | .................... | F16B 19/05 29/243.529 |
| 7,877,948 B2 | 2/2011 | Davies | | |
| 9,651,081 B2 * | 5/2017 | Diehl | .................. | B29C 66/8322 |
| D799,315 S | 10/2017 | May et al. | | |
| 10,371,194 B2 * | 8/2019 | Poblete | ................. | F16B 43/001 |
| 2003/0165369 A1 * | 9/2003 | Wolf | ....................... | F16B 39/34 411/303 |
| 2013/0129444 A1 * | 5/2013 | May | ........................ | F16B 39/34 411/234 |
| 2014/0165370 A1 * | 6/2014 | Stahl | ....................... | F16B 39/28 29/525.11 |
| 2016/0068275 A1 * | 3/2016 | Rizza | ...................... | F16B 39/28 411/132 |
| 2016/0273572 A1 * | 9/2016 | Dobbin | ................. | F16B 43/001 |
| 2017/0114823 A1 * | 4/2017 | Goyer | .................... | F16B 37/00 |
| 2018/0231049 A1 * | 8/2018 | Archer | .................... | F16B 39/26 |

FOREIGN PATENT DOCUMENTS

| | | |
|---|---|---|
| JP | 2000320520 | 11/2000 |
| RU | 2016103104 | 8/2017 |
| RU | 2016103104 A | 8/2017 |

OTHER PUBLICATIONS

"Properly Tightened", www.miningmagazine.com, dated Jul. 2014 (2 pages).
Notification of Transmittal of the International Search Report and the Written Opinion of the International Searching Authority, or the Declaration, Form PCT/ISA/220, dated Oct. 18, 2018.
English Translation of Abstract of Chinese Patent Application No. 201221543 dated Nov. 5, 2019.
English Translation of Abstract of Japanese Patent Application No. 2000320520 dated Nov. 5, 2019.
English Translation of Abstract of Russian Patent Application No. 2016103104 dated Nov. 5, 2019.
English Abstract of Japanese Patent Application No. 2000320520 dated Feb. 16, 2022.
English Abstract of Russian Patent Application No. 2016103104 dated Feb. 17, 2022.

\* cited by examiner

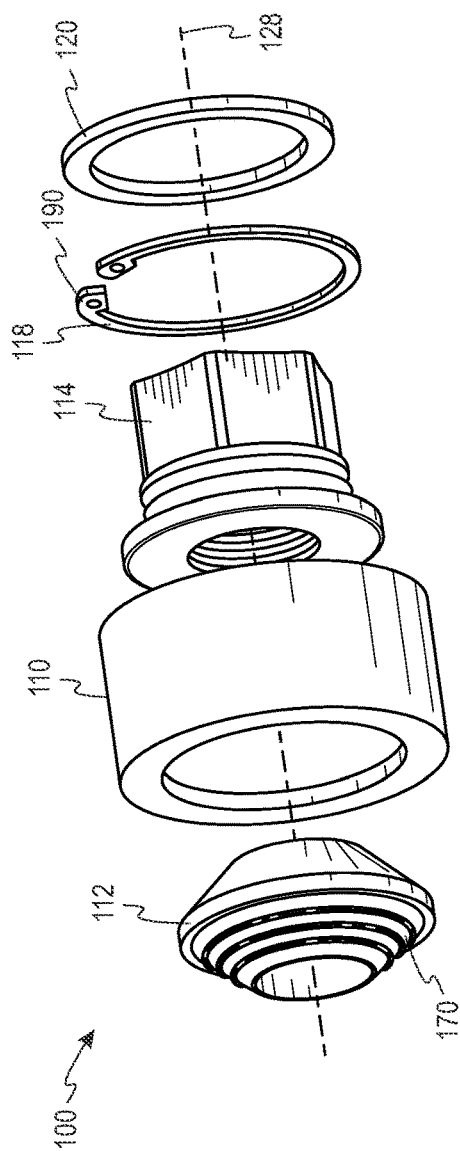
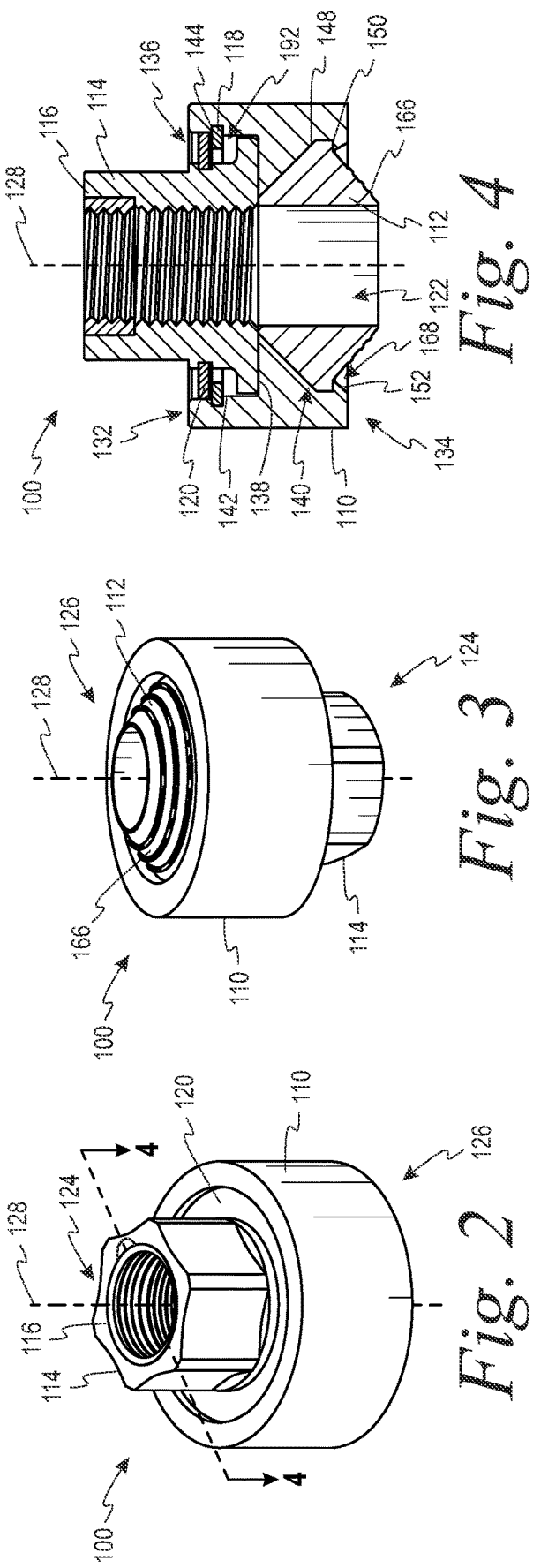

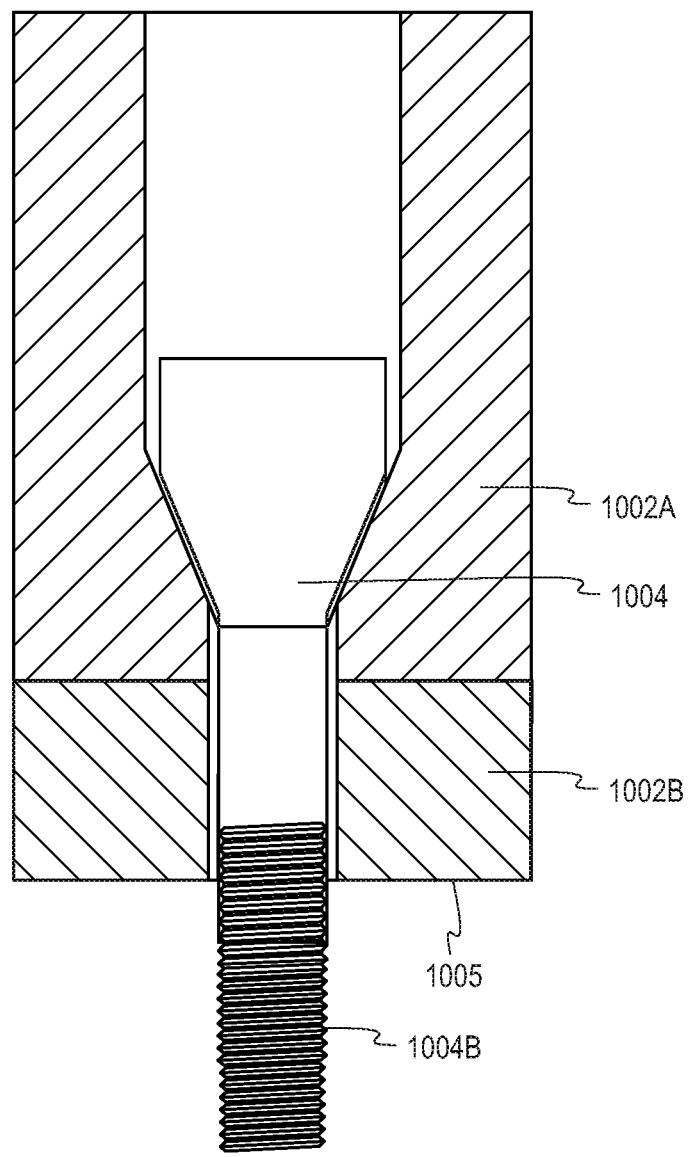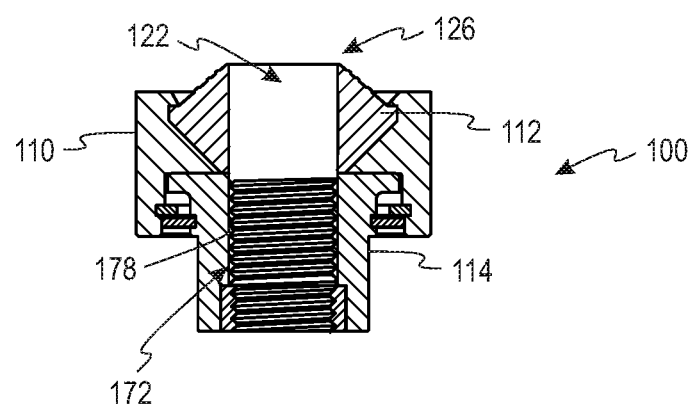
Fig. 10C

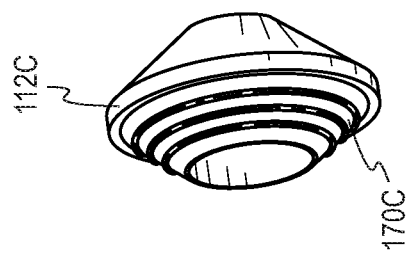
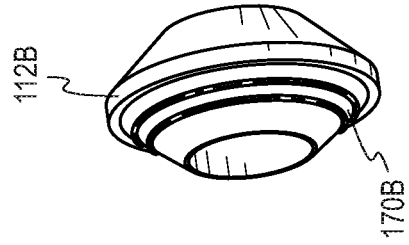
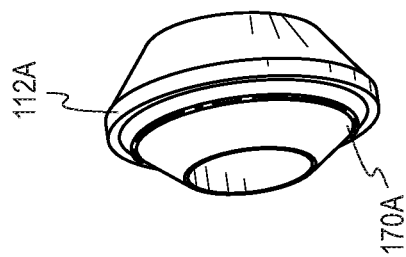
Fig. 11

FASTENER SYSTEMS AND METHODS

CROSS-REFERENCE TO RELATED APPLICATION

The present application claims priority to U.S. Provisional Patent Application No. 62/574,586, filed on Oct. 19, 2017, which is hereby incorporated by reference in its entirety.

FIELD

The present disclosure generally relates to fastener systems and methods, and more particularly to fastener systems and methods for coupling and sealing a plurality of structural elements.

BACKGROUND

Mills are used in a variety of mining operations to mine mineral ores. A typical mill includes a cylindrical shell and a sacrificial liner to protect the shell. A fastener system including a plurality of liner bolts, rubber seals, washers, and nuts are typically used to secure the sacrificial liner to the shell.

SUMMARY

In an example, a system includes a washer, a nut, a retainer structure, and a gasket. The washer has a bore extending between a distal end and a proximal end. A first section of the bore extends from the distal end to a shoulder portion. A second section of the bore extends from the shoulder portion to the proximal end. The shoulder portion defines an aperture. The nut is configured to be received in the first section of the bore. The nut includes a threaded section configured to threadably engage a threaded shaft of a bolt. The retainer structure is configured to axially retain the nut in the first section of the bore of the washer. The gasket has a through-bore axially aligned with the bore of the washer and the threaded section of the nut. The gasket is configured to be axially retained in the second section of the bore of the washer.

In another example, a method of assembling a fastener system is described. The fastener system includes a washer, a nut, a retainer structure, and a gasket. The washer includes a bore extending between a distal end and a proximal end. A first section of the bore extends from the distal end to a shoulder portion. A second section of the bore extends from the shoulder portion to the proximal end. The method includes inserting the gasket in the second section of the bore of the washer. The gasket is axially retained in the second section of the bore. The method also includes inserting the nut in the first section of the bore of the washer. The method further includes coupling the retainer structure to the washer in the first section of the bore to axially retain the nut in the first section of the bore of the washer.

In another example, a fastener system includes a washer, a gasket, a nut, and a lock ring. The washer has a bore extending between a distal end and a proximal end. The gasket has a through-bore axially aligned with the bore of the washer. The gasket is configured to be axially retained in the bore of the washer. The nut includes a bore having a threaded section and an unthreaded section. The threaded section is configured to threadably engage a threaded shaft of a bolt. The lock ring is in the unthreaded section of the nut. The lock ring includes a threaded inner wall and an outer surface having a lug. The lug is configured to rotatably lock the lock ring to the nut.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 1 is an exploded view of a fastener system according to an example embodiment.

FIG. 2 is a perspective view of the fastener system of FIG. 1.

FIG. 3 is another perspective view of the fastener system of FIG. 1.

FIG. 4 is a cross-sectional view of the fastener system of FIG. 1.

FIG. 10C depicts a third stage of a process for coupling a first structural element and a second structural element, according to an example embodiment.

FIG. 11 depicts a kit of gaskets according to an example embodiment.

DETAILED DESCRIPTION

Figure 5:
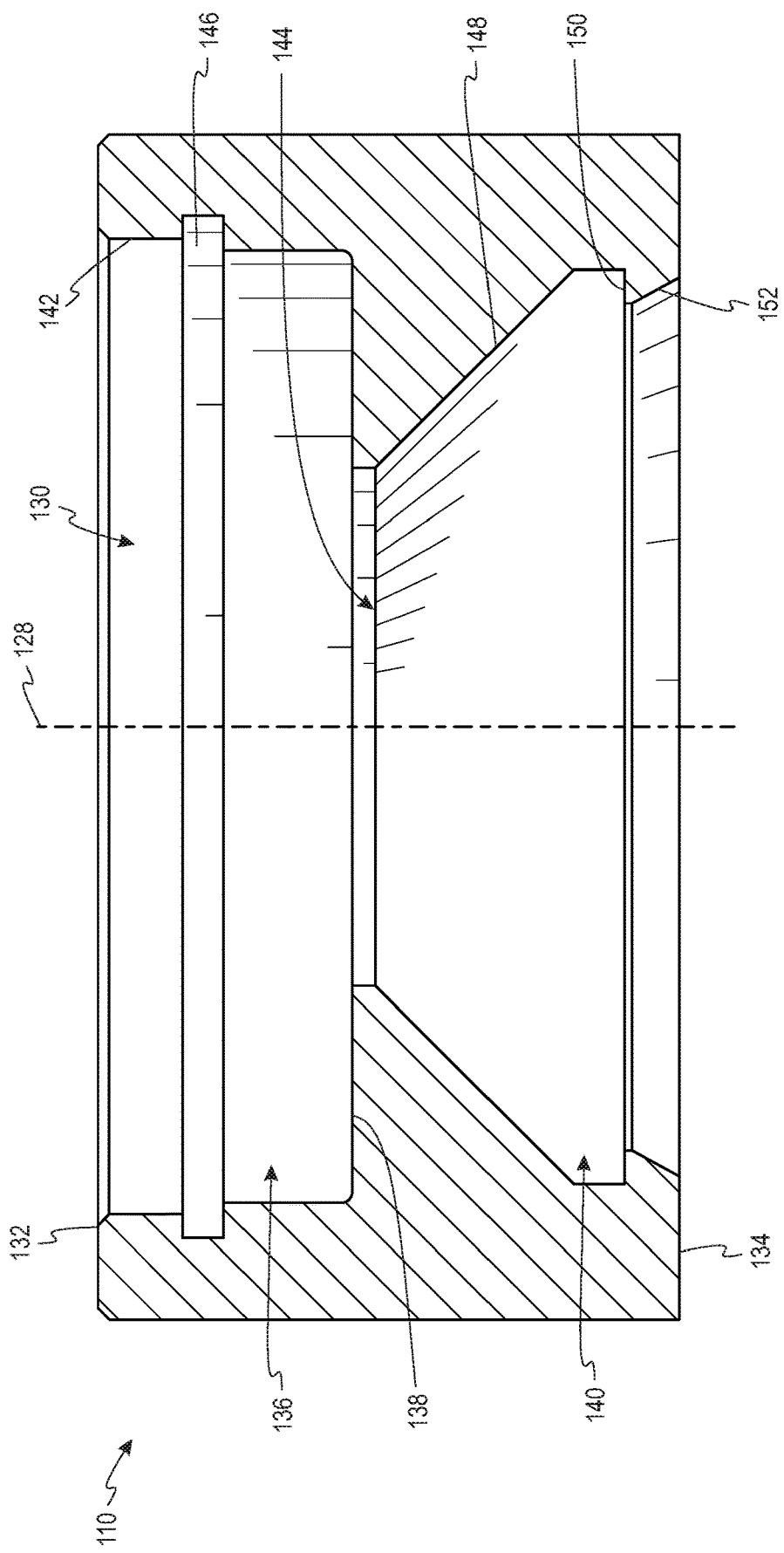
FIG. 5 is a cross-sectional view of a washer according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, conventionally a sacrificial liner is coupled to a mill shell by a fastener system including a linear bolt, a rubber seal, a washer, and a nut. A problem with conventional fastener systems is that the rubber seal tends to experience heavy wear and tear, which may lead to slurry egressing from the mill through the sacrificial liner and the mill shell.

Additionally, the sacrificial liners are routinely replaced during maintenance of the mills. To do so, the fastener system is decoupled from the sacrificial liner and the mill shell. When the bolt is unthreaded from the nut, there is no longer any structure holding together the rubber seal, the washer, and the nut. As such, it can be difficult to handle these distinct and separate components as the fastener system is decoupled from the sacrificial liner and the mill shell. In some instances, one or more of these components may fall causing damage to the components and/or making retrieval of the components challenging (e.g., a bolt may fall through a grating). Accordingly, handling and using conventional fastener systems can be time-consuming and inefficient, and may lead to extended downtime of the mill.

The fastener systems of the present disclosure can beneficially address one or more of the drawbacks of conventional fastener systems. For example, the fastener systems of the present disclosure can include a washer that can retain one or more components of the fastener systems (e.g., a gasket and/or a nut). Additionally, for example, the fastener systems of the present disclosure can beneficially improve the seal by compressing and deforming a gasket into engagement with a threaded shaft of the liner bolt.

Referring now to FIGS. 1-4, a fastener system 100 is depicted according to an example embodiment of the present application. More particularly, FIG. 1 is an exploded view of the fastener system 100, FIG. 2 and FIG. 3 are perspective views of the fastener system 100, and FIG. 4 is a cross-sectional view of the fastener system 100 taken through line 4 in FIG. 2.

As shown in FIGS. 1-4, the fastener system 100 includes a washer 110, a gasket 112, a nut 114, a lock ring 116, a retainer structure 118, and a protective structure 120. The fastener system 100 includes a passageway 122 extending from a distal end 124 of the fastener system 100 to a proximal end 126 of the fastener system 100. In FIGS. 1-4, the passageway 122 has an axis 128. As described in further detail below, the passageway 122 can have a size and shape that is based, at least in part, on a size and shape of a bolt to which the fastener system 100 may be coupled.

FIG. 5 is a cross-sectional side view of the washer 110 according to an example. As shown in FIGS. 4-5, at the washer 110, the passageway 122 is provided by a bore 130 extending from a distal end 132 of the washer 110 to a proximal end 134 of the washer 110. As shown in FIGS. 4-5, a first section 136 of the bore 130 extends from the distal end 132 of the washer 110 to a shoulder portion 138 in the bore 130. Additionally, as shown in FIGS. 4-5, a second section 140 of the bore 130 extends from the shoulder portion 138 to the proximal end 134 of the washer 110. As such, in this example, the shoulder portion 138 can partition the bore 130 into the first section 136 and the second section 140.

Additionally, as shown in FIGS. 4-5, the first section 136 of the bore 130 includes a side wall 142 extending from the distal end 132 of the washer 110 to the shoulder portion 138. The shoulder portion 138 extends inwardly from the side wall 142 toward the axis 128 to provide an end wall of the first section 136. The shoulder portion 138 defines an aperture 144 centered on the axis 128. The side wall 142 can include a recess 146 that is suitable for retaining the retainer structure 118, as shown in FIG. 4 and described in further detail below.

Also, as shown in FIGS. 4-5, the second section 140 of the bore 130 can include a first tapered wall 148 extending outwardly (i.e., away from the axis 128) from the shoulder portion 138 toward the proximal end 134 of the washer 110. Proximal of the first tapered wall 148 is a flange section 150, which extends inwardly to provide an engagement surface for axially retaining the gasket 112. The second section 140 further includes a second tapered wall 152 extending outwardly from the flange section 150 to the proximal end 134 of the washer 110. Accordingly, in this arrangement, the flange section 150 is between the first tapered wall 148 and the second tapered wall 152. Additionally, for example, the first tapered wall 148 can define a first conical portion of the second section 140, the flange section 150 can define a generally cylindrical portion of the second section 140, and the second tapered wall 152 can define a second conical portion of the second section 140.

As shown in FIGS. 4-5, the washer 110 can receive and axially retain the gasket 112 in the second section 140 of the bore 130. The gasket 112 can be made from a deformable material such as, for example, a rubber, polyisoprene, and/or polybutadiene.

Figure 6:
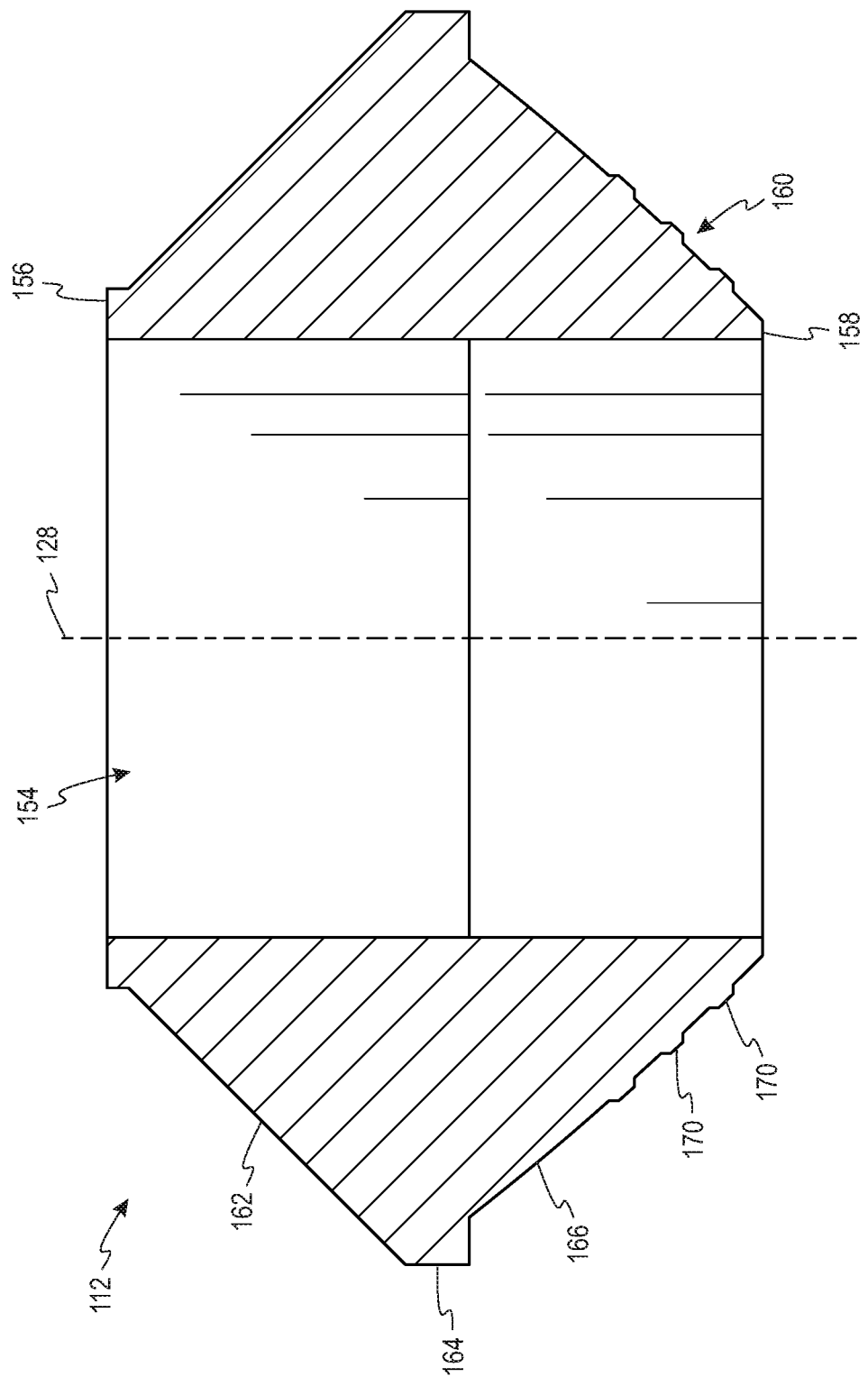
FIG. 6 is a cross-sectional view of a gasket according to an example embodiment.

FIG. 6 depicts a cross-sectional side view of the gasket 112 according to an example. As shown in FIGS. 1-4 and FIG. 6, the gasket 112 has a through-bore 154 that extends from a first end wall 156 of the gasket 112 to a second end wall 158 of the gasket 112. The through-bore 154 is centered on the axis 128 and, thus, is axially aligned with the bore 130 of the washer 110.

An exterior surface 160 of the gasket 112 includes a distal portion 162, a flange portion 164, and a proximal portion 166. The distal portion 162 of the exterior surface 160 tapers outwardly (i.e., away from the axis 128) from the first end wall 156 toward the flange portion 164. In an example, the distal portion 162 can have a surface profile with a contour that approximately matches a tapered contour of the first tapered wall 148 in the second section 140 of the washer 110. As described further below, this can assist in guiding deformation of the gasket 112 toward a bolt when the gasket 112 is compressed during coupling of the fastener system 100 to a structural element.

The flange portion 164 can provide for axial retention of the gasket 112 in the second section 140 of the washer 110. More particularly, a diameter (or other dimension) of the flange portion 164 can be greater than a diameter (or other dimension) of the flange section 150 in the bore 130 of the washer 110. As such, to couple the gasket 112 to the washer 110, the gasket 112 can be deformed and inserted into the bore 130 at the proximal end 134 of the washer 110. Once the flange portion 164 of the gasket 112 passes the flange section 150 of the washer 110, the gasket 112 can return to a non-deformed shape (i.e., relaxed shape) as shown in FIG. 4.

In this arrangement, the flange section 150 of the washer 110 engages the flange portion 164 of the gasket 112 to axially retain the gasket 112 in the second section 140 of the washer 110. As shown in FIG. 4, when the gasket 112 is received in the second section 140 of the washer 110, (i) the distal portion 162 of the gasket 112 can abut the first tapered wall 148 and (ii) the first end wall 156 of the gasket 112 can be at or proximal to the shoulder portion 138 of the washer 110. Further, in the example shown in FIG. 4, the distal portion 162 of the gasket 112 generally corresponds in shape and size to the first tapered wall 148 of the washer 110, and the flange portion 164 of the gasket 112 generally corresponds in shape and size to the flange section 150 of the washer 110.

As shown in FIG. 4 and FIG. 6, the proximal portion 166 of the exterior surface 160 tapers inwardly from the flange portion 164 toward the second end wall 158. As shown in FIG. 4, a gap 168 is formed between the proximal portion 166 of the gasket 112 and the second tapered wall 152 of the washer 110 when the gasket 112 is received in the second section 140 of the washer 110. As described in further detail below, the gap 168 can provide a space into which the gasket 112 can deform when the fastener system 100 engages a structural element while coupled to a bolt.

As shown in FIGS. 3-4, the proximal portion 166 can extend beyond the proximal end 134 of the washer 110 when the gasket 112 is coupled to the washer 110 (and the fastener system 100 is disengaged from a structural element). As shown in FIG. 1, FIG. 3, and FIG. 6, the proximal portion 166 can include one or more indicator markings 170. For instance, the indicator marking(s) 170 can include a quantity of raised rings on the proximal portion 166 of the gasket 112; however, the indicator marking(s) 170 can have a different structure (e.g., recessed rings, raised bumps, text, symbols, colors, etc.) in other examples. In one implementation, the indicator marking(s) 170 can indicate a size of the gasket 112.

Figure 7:
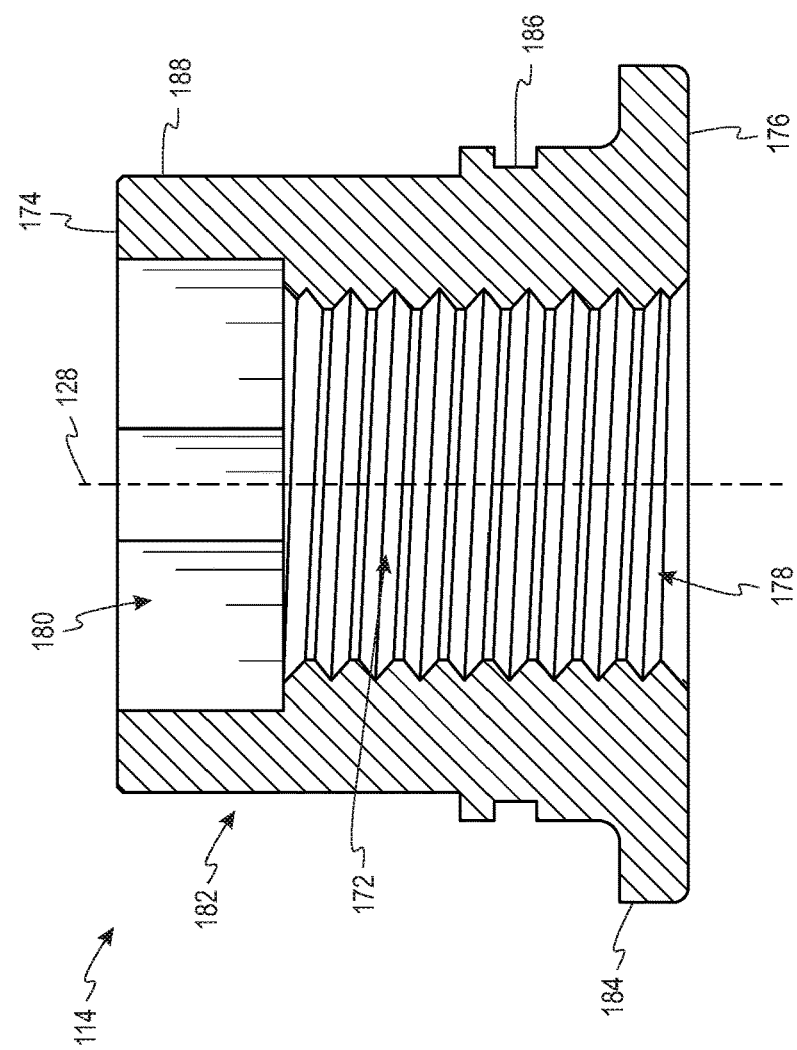
FIG. 7 is a cross-sectional view of a nut according to an example embodiment.

As shown in FIG. 4, the washer 110 can receive and axially retain the nut 114, the retainer structure 118, and the protective structure 120 in the first section 136 of the bore 130. FIG. 7 depicts a cross-sectional view of the nut 114 according to an example. As shown in FIGS. 4 and 7, the nut 114 includes a bore 172 that extends from a first end face 174 to a second end face 176 of the nut 114. The bore 172 includes a threaded section 178 and an unthreaded section 180, which are axially aligned with the axis 128. The threaded section 178 is proximal of the unthreaded section 180 in the bore 172. The threaded section 178 can threadably engage with threads on the bolt. The unthreaded section 180 can receive the lock ring 116, as described further below.

An outer surface 182 of the nut 114 includes a flange 184, a groove 186, and a grip portion 188. The flange 184 has a diameter (or other dimension) that is greater than the diameter of the aperture 144 in the shoulder portion 138 (as shown in FIG. 5). As such, the shoulder portion 138 can provide a stop structure, which limits the axial movement of the nut 114 in the proximal direction. In FIGS. 4-5 and 7, the shoulder portion 138 and the second end face 176 are generally flat surfaces, which are substantially perpendicular to the axis 128. This can beneficially facilitate distributing force over a relatively large surface area of the shoulder portion 138 of the washer 110 and the second end face 176 of the nut 114 when the fastener system 100 is under tension.

The flange 184 of the nut 114 and the first section 136 of the washer 110 are sized and shaped such that the nut 114 and the washer 110 can rotate relatively to each other (i.e., the nut 114 and the washer 110 are not rotationally fixed). For example, the flange 184 of the nut 114 and/or the side wall 142 of the first section 136 in the washer 110 can have a generally circular shape. Additionally, for example, the diameter of the first section 136 of the bore 130 can be greater than the diameter of the flange 184 of the nut 114.

In FIGS. 1-2 and 7, the grip portion 188 is hexagonal; however, the grip portion 188 can have a different shape in other examples. In general, the grip portion 188 can have a non-round shape that facilitates applying torque to the grip portion 188 and/or resisting rotation of grip portion 188 while torque is applied to a bolt being coupled to the fastener system 100. Within examples, the nut 114 can be made of a metal.

In FIGS. 1 and 4, the retainer structure 118 is a retaining ring, which can retain the nut 114 in the first section 136 of the washer 110 when positioned in the recess 146. As shown in FIG. 1, the retainer structure 118 includes a generally ring-shaped structure having a pair of free ends 190. Each of the free ends 190 can include a lug hole 191. The lug hole 191 can receive a tool (e.g., a pliers) for deforming the retainer structure 118 during insertion and removal of the retainer structure 118 from the recess 146 of the washer 110.

As shown in FIG. 4, when the retainer structure 118 is in the recess 146, a first portion of the retainer structure 118 engages the recess 146 and a second portion of the retainer structure 118 extends inwardly (i.e., from the recess 146 toward the axis 128) past the side wall 142 of the first section 136. As such, the retainer structure 118 can have a cross-sectional width that is greater than a corresponding cross-sectional width of the recess 146. In this arrangement, the second portion of the retainer structure 118 can provide a stop structure, which limits axial movement of the nut 114 in the distal direction due to engagement between the flange 184 and the second portion of the retainer structure 118.

Also, as shown in FIG. 4, when the retainer structure 118 is in the recess 146, a dwell 192 is formed between the shoulder portion 138 of the washer 110 and the retainer structure 118, and the flange 184 of the nut 114 is in the dwell 192. The dwell 192 provides a space in which the nut 114 can axially move within the washer 110 (i.e., the nut 114 can move axially between a distal point at which the nut 114 engages the retainer structure 118 and a proximal point at which the nut 114 engages the shoulder portion 138 of the washer 110). By allowing the nut 114 to axially move within the dwell 192, the nut 114 can be allowed to rotate relative to the washer 110 and the gasket 112 during certain stages of a process for fastening a plurality of structural elements to each other using the fastener system 100 and a bolt, as described further below.

The protective structure 120 can be received in the first section 136 of the bore 130 of the washer 110 distal of the retainer structure 118 and the flange 184 of the nut 114. For example, the protective structure 120 can be retained in the groove 186 of the nut 114. The protective structure 120 is a generally ring-shaped structure having a cross-sectional width that corresponds to a distance between the groove 186 and the side wall 142 of the washer 110. In this arrangement, the protective structure 120 can provide a barrier that inhibits (or prevents) ingress of dirt and/or debris into a proximal portion of the first section 136 of the washer 110. As examples, the protective structure 120 can be made from a rubber, a silicone, and/or a plastic material.

Figure 8:
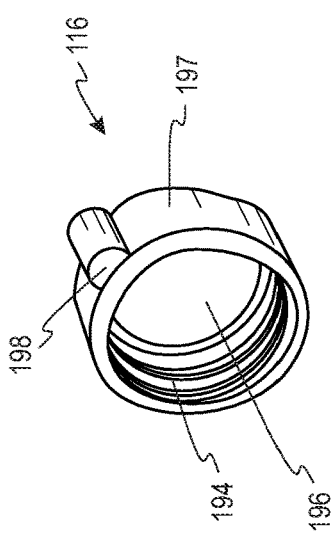
FIG. 8 is a perspective view of a lock ring according to an example embodiment.

As noted above, the lock ring 116 can be received in the unthreaded section 180 of the bore 172 in the nut 114. FIG. 8 depicts the lock ring 116 according to an example. As shown in FIG. 8, the lock ring 116 includes a threaded inner wall 194 defining a threaded bore 196 for threadably engaging a threaded shaft of a bolt, and an outer surface 197 having a lug 198 for rotatably locking the ring to the nut 114. The lug 198 has a semi-circular configuration and extends substantially the entire height of the lock ring 116. The lug 198 can be beveled on one or both ends. In other examples, the lug 198 can have any other suitable structure and/or the lock ring 116 can include additional lugs 198. The lock ring 116 can additionally or alternatively include any other suitable locking structure for rotatably locking the lock ring 116 to the nut 114, such as, for example, one or more knurls, keyways, dowel pins or the like.

Before coupling to the nut 114, the lock ring 116 initially has a generally elliptical shape. The generally elliptical shape is not intended to require symmetry, especially since the lock ring 116 may need to be distorted to achieve its generally elliptical shape. The lock ring 116 can be made from any suitable steel alloy or any other suitable material. The lock ring 116 can have any other structure and configuration in accordance with other embodiments of the present disclosure.

In some examples, a thermal diffusion coating can be applied to the lock ring 116. The thermal diffusion coating can be applied in any suitable manner. The thermal diffusion process creates a zinc metal layer alloyed to the surface of the lock ring 116, utilizing a zinc powder formulation or other suitable formulation. The lock ring 116 can be coated by adding the ring and a suitable amount of the formulation to a drum, which is sealed and heated in an oven or the like. The drum rotates slowly in the oven, while it undergoes a multi-stage heating and cooling cycle. The thermal diffusion coating may be applied in any other suitable manner in accordance with other embodiments of the present disclosure. The thermal diffusion coating adds to the life of the lock ring 116 and the nut 114 because, among other reasons, it reduces galling between the lock ring 116 and bolt.

Figure 9:
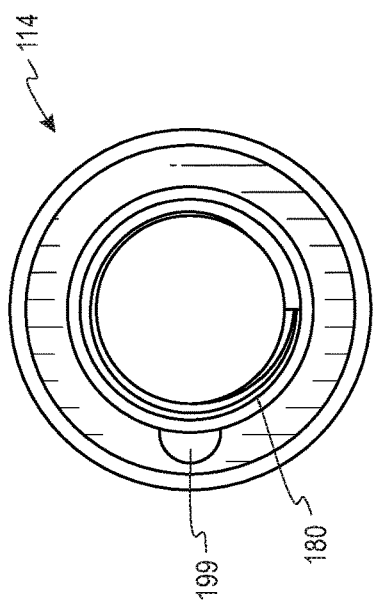
FIG. 9 is a top view of the nut of FIGS. 1 and 7.

FIG. 9 depicts a top view of the nut 114 according to an example. As noted above, the lock ring 116 is received by the unthreaded section 180 of the bore 172 in the nut 114. A top face of the nut 114 defines a slot 199 contiguous with the unthreaded section 180 of the bore 172 for receiving the lug 198 of the lock ring 116 to rotatably lock the lock ring 116 to the nut 114. The nut 114 can be made of steel or any other suitable material.

When the nut 114 and the lock ring 116 are assembled, the lock ring 116 is rotatably locked to the nut 114. The lock ring 116 is disposed within the unthreaded section 180 of the bore 172 and the lug 198 disposed within the slot 199 defined by the nut 114. The threaded inner wall 194 of the lock ring 116 is in general axial alignment with the threaded section 178 of the nut 114. There may be separation between the threaded inner wall 194 of the lock ring 116 and the threaded section 178 even though they are in general axial alignment. The lock ring 116 with its generally elliptical configuration is disposed within the substantially cylindrical unthreaded section 180 of the bore 172. The lock ring 116 may be squeezed or pressed in any suitable manner as it is inserted into the unthreaded section 180 of the bore 172. The generally elliptical shape of the lock ring 116 engages the unthreaded section 180 of the nut 114 to maintain the lock ring 116 within the unthreaded section 180 of the bore 172.

In the example depicted by FIGS. 1-5, the proximal end 134 of the washer 110 has a generally flat surface profile. In an alternative example, the proximal end 134 of the washer 110 can have a contoured surface profile. For instance, the proximal end 134 can be contoured to match a surface profile of a surface of a structural element that the proximal end 134 engages when the fastener system 100 is under tension. This can help to distribute the force over a greater surface area and/or reduce (or prevent) defection of the washer 110 when under tension.

In implementations in which the proximal end 134 has a contoured surface profile, the washer 110 can include one or more alignment markings on an exterior surface of the washer 110. By aligning the markings relative to each other or another reference point, the washer 110 can be aligned such that the proximal end 134 properly mates with the structural element.

To assemble the fastener system 100, the gasket 112 can be coupled to the washer 110. For example, the distal portion 162 of the gasket 112 can be inserted into the second section 140 of the bore 130 in the washer 110 until the flange portion 164 of the gasket 112 is located in the flange section 150 of the washer 110. As noted above, because the flange portion 164 is greater in size than the second tapered wall 152 of the washer 110, the gasket 112 can be deformed as it is inserted to allow the flange portion 164 of the gasket 112 to pass into the flange section 150 of the washer 110. After the gasket 112 is fully inserted into the second section 140 of the washer 110, the flange portion 164 of the gasket 112 abuts the flange section 150 of the washer 110 to axially retain the gasket 112 in the second section 140 of the washer 110.

Within some examples, prior to inserting the gasket 112 in the washer 110, an adhesive can be applied to the second tapered wall 148 of the washer 110 and/or the distal portion 162 of the gasket 112. In such examples, the adhesive can assist and/or enhance the axial retention of the gasket 112 in the washer 110.

Additionally, to assemble the fastener system 100, the nut 114, the retainer structure 118, and the protective structure 120 are coupled to the washer 110. To do so, the nut 114 is first inserted into the first section 136 of the bore 130 in the washer 110. The nut 114 can be inserted until the second end wall 176 of the nut 114 abuts against the shoulder portion 138 of the washer 110. Within some examples, prior to inserting the nut 114, a grease can be applied to the second end wall 176 of the nut 114 and/or the shoulder portion 138 of the washer 110. Applying the grease can reduce friction between the nut 114 and the washer 110, for example, during rotation of the nut 114 relative to the washer 110.

After inserting the nut 114 in the first section 136 of the washer 110, the retainer structure 118 can be inserted in the recess 146. For example, this can include inserting a tool (e.g., pliers) into the lug holes 191 of the retainer structure 118 and applying a force, using the tool, to reduce the size of the retainer structure 118 to a size that is smaller than a diameter of the side wall 142 of the first section 136 of the bore 130 the washer 110. While applying the force to retainer structure 118, the retainer structure 118 can be inserted into the bore 130 and located at the recess 146. The force applied by the tool can be removed and the retainer structure 118 can then expand into the recess 146. With the retainer structure 118 in the recess 146, at least a portion of the retainer structure 118 extends inwardly from the side wall 142 to provide an axial stop, limiting movement of the nut 114 in the distal direction.

After the retainer structure 118 is inserted in the recess 146, the protective structure 120 is inserted in the groove 186 on the nut 114. The lock ring 116 can be inserted into the nut 114 at before, during, or after inserting the nut 114 into the washer 110.

In the assembled state, the washer 110, the gasket 112, the nut 114, the lock ring 116, the retainer structure 118, and the protective structure 120 are coupled to each other. As such, the fastener system 100 can provide an integrated assembly unit for coupling with a bolt.

A process for coupling a plurality of structural elements to each other using the fastener system 100 and a bolt will now be described with respect to FIGS. 10A-10E. In one example, the plurality of structural elements 1002A, 1002B can include a mill shell and a sacrificial liner for a ball mill, a roller mill, and/or a SAG mill. However, in other examples, the structural elements 1002A, 1002B can include any structures. More generally, the structural elements 1002A, 1002B can be structures that are coupled to each other, experience rigorous operating conditions (e.g., relatively substantial vibrational forces), and/or provide a seal against fluid egress from one side of the structures to another side of the structures.

For simplicity, the example process is described for two structural elements 1002A, 1002B; however, the fastener system 100 can be used to couple more than two structural elements 1002A, 1002B in other examples. For instance, in another example, a rubber layer can be arranged between a sacrificial liner and a mill shell, and the fastener system 100 can be used to couple the sacrificial liner, the rubber layer, and the mill shell to each other.

Figure 10A:
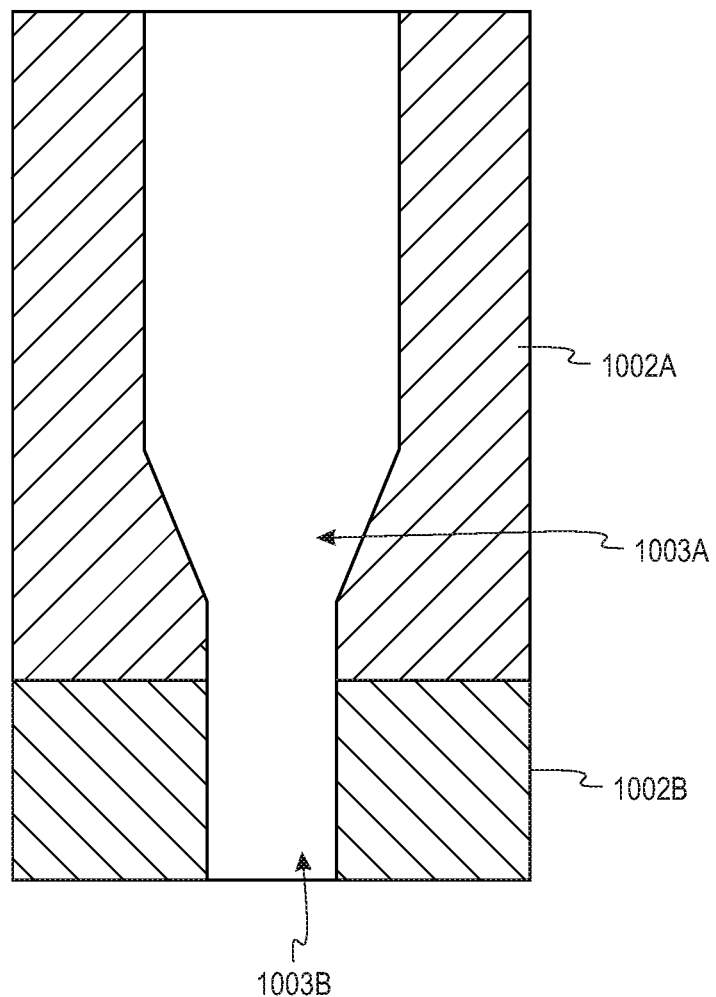
FIG. 10A depicts a first stage of a process for coupling a first structural element and a second structural element, according to an example embodiment.
Figure 10B:
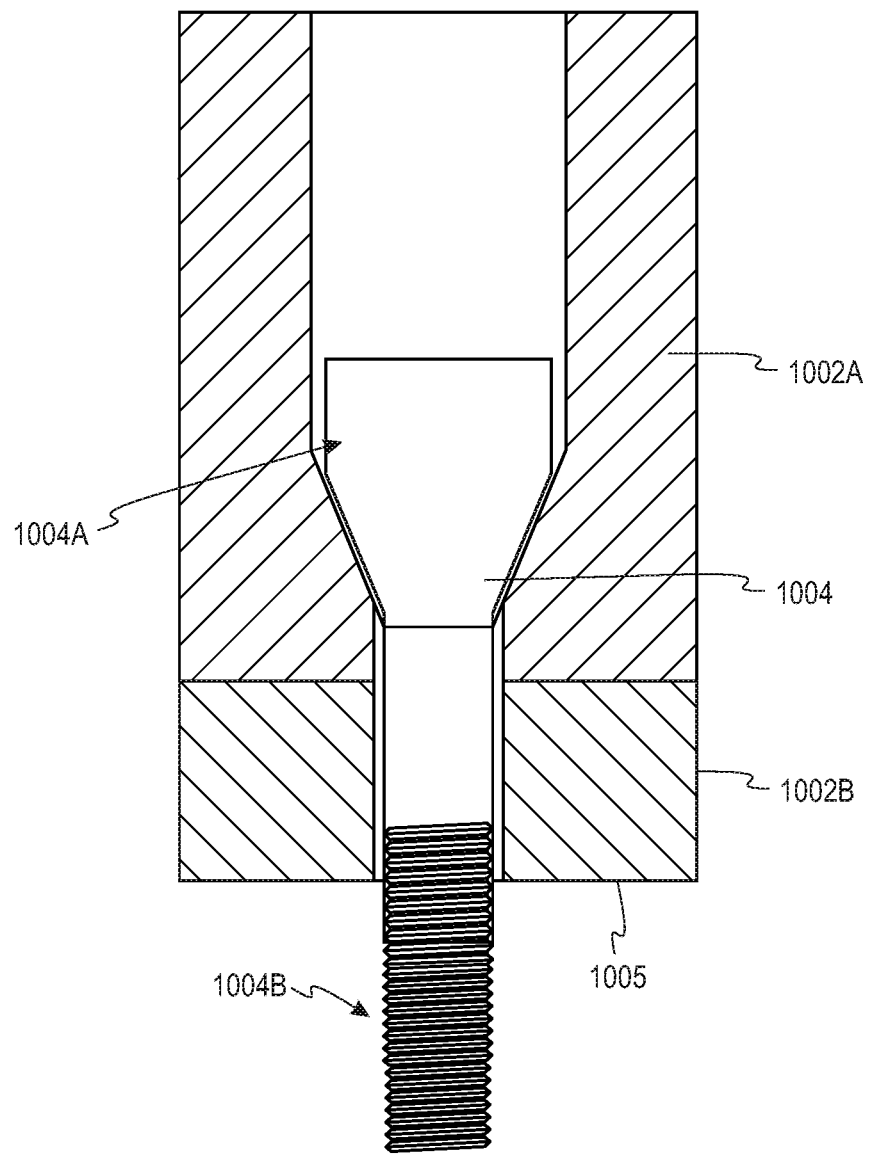
FIG. 10B depicts a second stage of a process for coupling a first structural element and a second structural element, according to an example embodiment.

As shown in FIG. 10A, the first structural element 1002A and the second structural element 1002B can each include an aperture 1003A, 1003B. In operation, the first structural element 1002A and the second structural element 1002B can be positioned such that the apertures 1003A, 1003B are aligned. Then, as shown in FIG. 10B, a bolt 1004 can be inserted through the apertures 1003A, 1003B of the first structural element 1002A and second structural element 1002B. The bolt 1004 can have a bolt head 1004A and a threaded shaft 1004B. In some examples, the bolt head 1004A can reside in a recess in an interior surface of the first structural element 1002A.

As shown in FIG. 10B, after the bolt 1004 is inserted, the threaded shaft 1004B extends from an exterior surface 1005 of the second structural element 1002B. Next, as shown in FIG. 10C, the fastener system 100 can be aligned with the bolt 1004 such that the proximal end 126 of the fastener system 100 faces the exterior surface 1005 of the second structural element 1002B, and the passageway 122 is axially aligned with the threaded shaft 1004B of the bolt 1004. The fastener system 100 can then be axially moved towards the second structural element 1002B until the threaded shaft 1004B of the bolt 1004 contacts the threaded section 178 of the bore 172 in the nut 114.

Figure 10D:
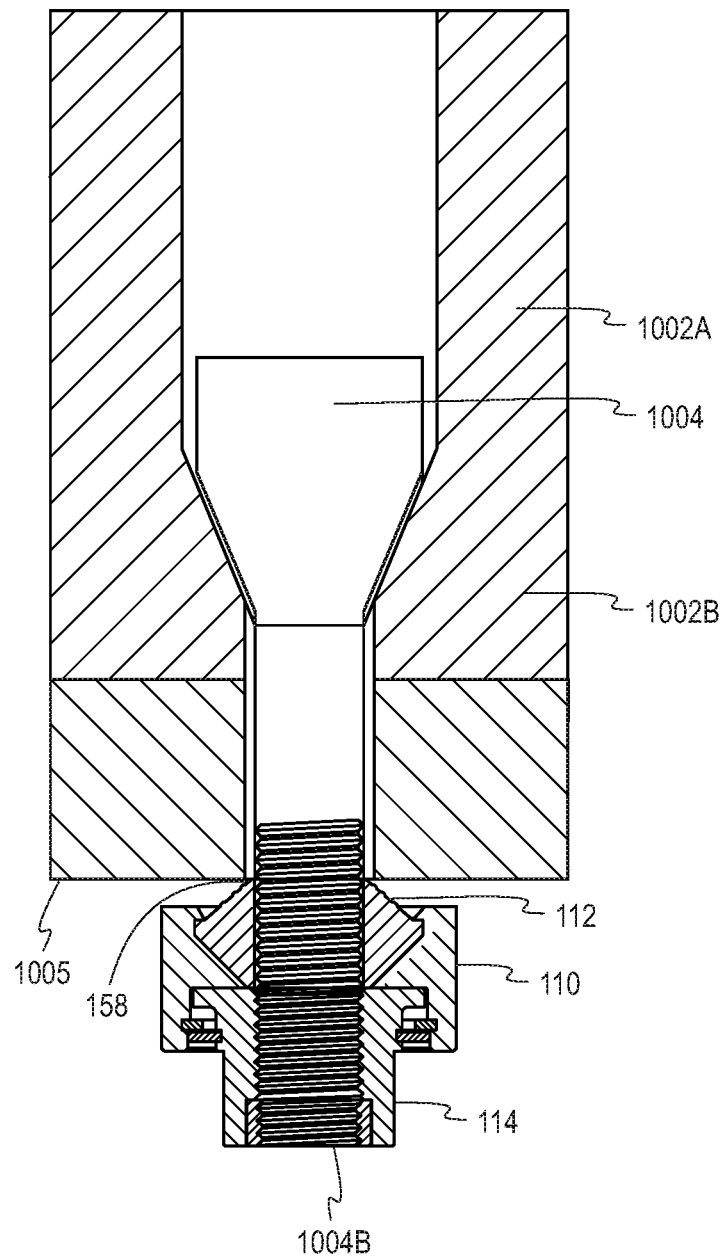
FIG. 10D depicts a fourth stage of a process for coupling a first structural element and a second structural element, according to an example embodiment.

Next, the nut 114 and/or the bolt can be rotated to move the nut 114 along the threaded shaft 1004B of the bolt 1004. Initially, the nut 114 can rotate relative to the washer 110 and the gasket 112. This can mitigate (or prevent) damage and/or wear on the washer 110 and/or the gasket 112. The fastener system 100 is moved towards the second structural element 1002B until the second end wall 158 of the gasket 112 contacts the exterior surface 1005 of the second structural element 1002B as shown in FIG. 10D. After the second end wall 158 of the gasket 112 contacts the second structural element 1002B, the nut 114 and/or the bolt 1004 can be further rotated.

Figure 10E:
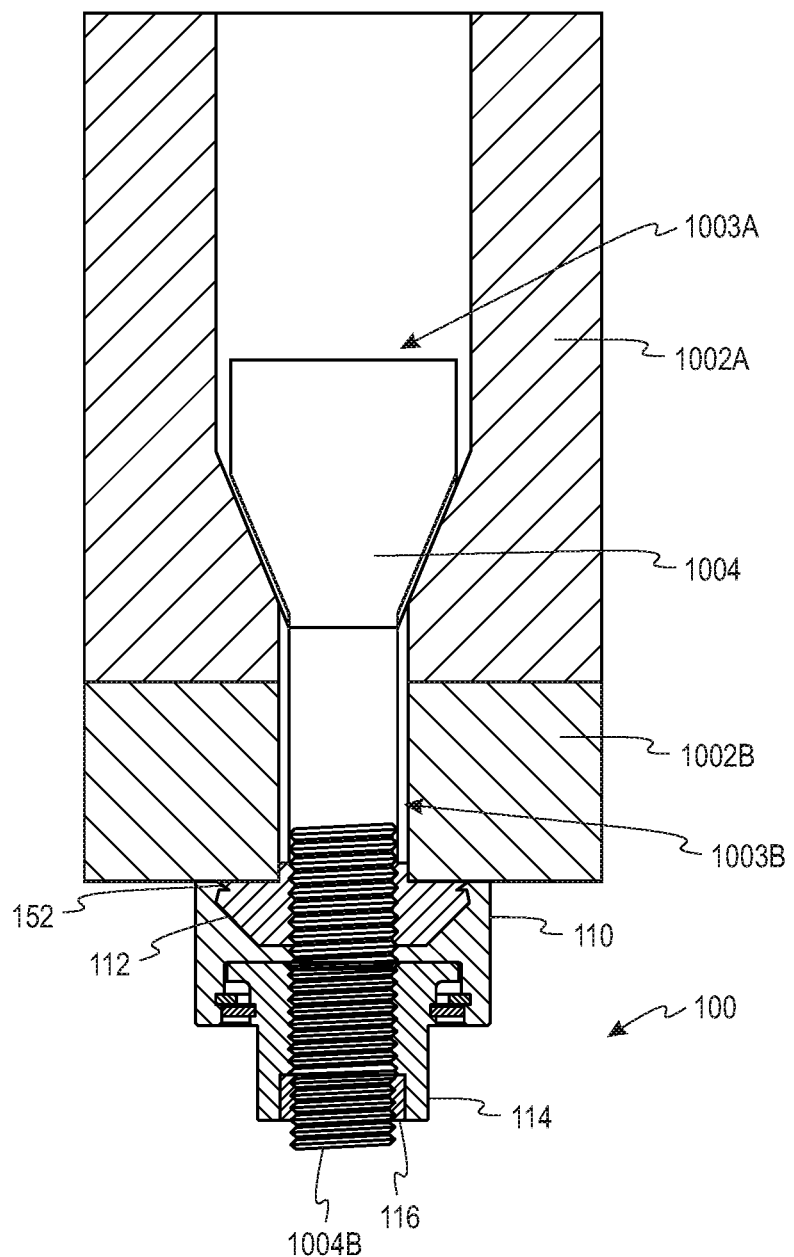
FIG. 10E depicts a fifth stage of a process for coupling a first structural element and a second structural element, according to an example embodiment.

As the nut 114 and/or the bolt 1004 are further rotated, the second structural element 1002B applies a force to the gasket 112. This force first causes a portion of the gasket 112 to deform towards and onto the threaded shaft 1004B of the bolt 1004, thereby sealing the apertures 1003A, 1003B of the first structural element 1002A and the second structural element 1002B. As the nut 114 and/or the bolt continue to rotate, the gasket 112 can further deform outwardly into the gap 168 (as shown in FIG. 4) between the gasket 112 and the second tapered wall 152 of the washer 110. When the nut 114 and the bolt 1004 achieve a desired and/or predetermined tension, rotation of the nut 114 and/or the bolt 1004 can cease. FIG. 10E depicts the fastener system 100 and the bolt 1004 coupling the first structural element 1002A to the second structural element 1002B under the desired and/or predetermined tension.

Within examples, when the nut 114 and the bolt are under the desired and/or predetermined tension, the proximal end 134 of the washer 110 contacts the exterior surface 1005 of the second structural element 1002B. To achieve this, the gap 168 is sized to allow for sufficient deformation of the gasket 112 so that the gasket 112 does not protrude proximally from the proximal end 134 (and inhibit or prevent contact between the proximal end 134 and the second structural element).

Also, during rotation of the nut 114 and/or the bolt 1004, the threaded shaft 1004B of the bolt 1004 eventually engages the lock ring 116. As the bolt 1004 rotates relative to the lock ring 116, the threaded shaft 1004B threadably climbs the threaded inner wall 194 of the lock ring 116. As the rotation continues, the threaded shaft 1004B of the bolt 1004 causes the lock ring 116 to distort to a generally circular shape. The distortion increases the stress in the lock ring 116. Rotational resistance results from the lock ring 116 due to its distorted condition such that a strong lock is provided between the lock ring 116 and the threaded shaft 1004B of the bolt 1004 to secure the bolt 1004 to the fastener system 100 and to prevent unlocking.

The distortion of the lock ring 116 creates a force normal to the direction of the axis of the threaded shaft 1004B of the bolt 1004. This force causes friction between the lock ring 116 and the threaded shaft 1004B of the bolt 1004 during rotation, and the increased force results in improved functionality of the fastener system 100. The thermal diffusion coating can help to reduce galling between the mating surfaces.

Within examples, due to the dimensions of the lock ring 116, the stress in the lock ring 116 as it is distorted during the engagement of the lock ring 116 and the shaft of the bolt 1004 is less than a yield stress of the lock ring 116. Because the stress in the distorted lock ring 116 is below the yield stress, the lock ring 116 will normally return to its original size and shape once the shaft 1004B is disengaged from the lock ring 116. The nut 114 and lock ring 116 can thus be repeatedly re-tightened and can be re-used. Additionally, because the stress is below the yield stress, the lock ring 116 is less susceptible to cracking failure, less likely to decrease in performance over time, and less likely to decrease in performance with repeated use. The inclusion of the thermal diffusion coating also provides benefits.

Designing or otherwise constructing the lock ring 116 and the nut 114 such that the stress in the lock ring 116 during engagement is less than the yield stress of the lock ring 116 can be achieved by engineering principles and/or by trial and error as described, for example, in U.S. application Ser. No. 13/298,971, filed on Nov. 17, 2011, which is hereby incorporated by reference in its entirety.

Within examples, the fastener system 100 can be reusable. That is, the fastener system 100 can be coupled and decoupled with the bolt 1004 and the structural elements 1002A, 1002B multiple times. In some instances, however, after an initial use of the fastener system 100, the apertures 1003A, 1003B of the first and second structural elements 1002A, 1002B may change. For example, during operation, vibrational forces may cause the bolt to wear on and enlarge one or more of the apertures 1003A, 1003B of the structural elements 1002A, 1002B. As such, when the fastener system 100 is to be re-coupled, the apertures 1003A, 1003B may be too large relative to the size of the gasket 112 to achieve a complete seal.

In this scenario, the initial gasket 112 can be removed from the fastener system 100 and a replacement gasket 112 can be inserted into the washer 110. The replacement gasket 112 can have a different size and/or shape to better seal the enlarged apertures 1003A, 1003B of the structural element(s) 1002A, 1002B. Accordingly, even though the aperture 1003A in the first structural element 1002A and/or the aperture 1003B in the second structural element 1002B has become enlarged, the fastener system 100 can retrofitted with the replacement gasket to achieve a target sealing capability.

In some examples, a kit including a plurality of gaskets 112 can be provided. Each gasket 112 in the kit can have a different size and/or shape (e.g., a differently sized and/or shaped proximal portion 166). Within some examples, each gasket 112 in the kit can have a respective indicator marking 170 indicating the size of the gasket 112. To select a replacement gasket 112 from the kit, the size of the aperture in the structural element(s) can be measured and, then the measured size can be used with a lookup table or chart to select an appropriately sized gasket 112 from the kit.

Referring to FIG. 11, a kit 1106 of gaskets 112A-112C is depicted according to an example embodiment. As shown in FIG. 11, the kit 1106 includes a first gasket 112A having a first size, a second gasket 112B having a second size, and a third gasket 112C having a third size. The first size of the first gasket 112A, the second size of the second gasket 112B, and the third size of the third gasket 112C are different than each other. As shown in FIG. 10, the first gasket 112A includes a first indicator marking 170A indicating the first size, the second gasket 112B includes a second indicator marking 170B indicating the second size, and the third gasket 112C includes a third indicator marking 170C indicating the third size. Additionally, as shown in FIG. 10, the first indicator marking 170A, the second indicator marking 170B, and the third indicator marking 170C are different from each other.

Figure 12A:
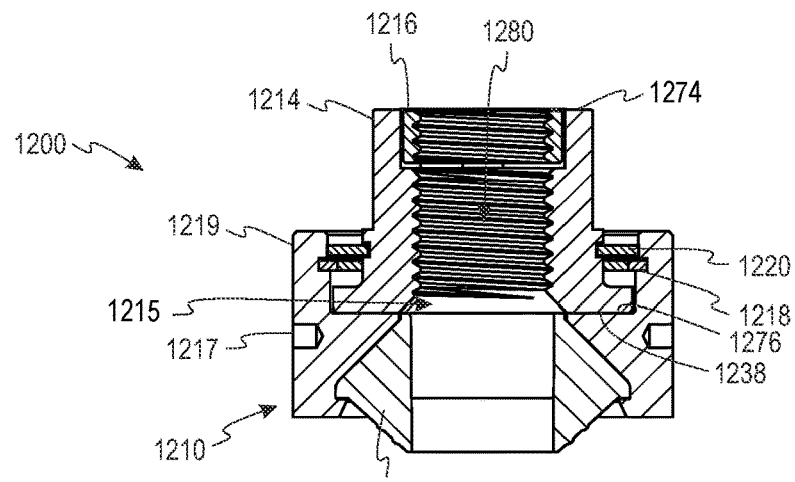
FIG. 12A is a cross-sectional view of a fastener system according to an example embodiment.
Figure 12B:
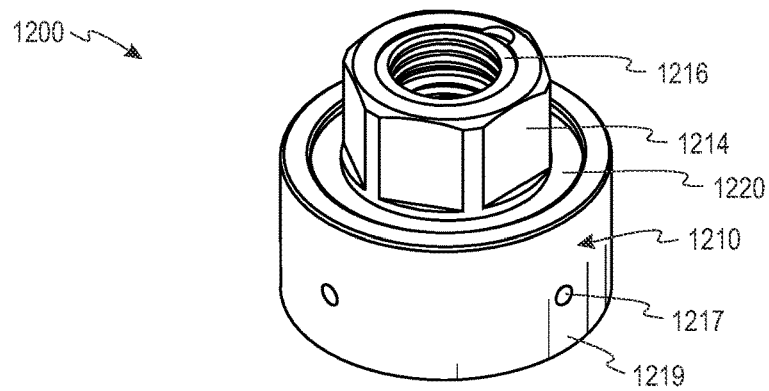
FIG. 12B is a perspective view of the fastener system of FIG. 12A.
Figure 12C:
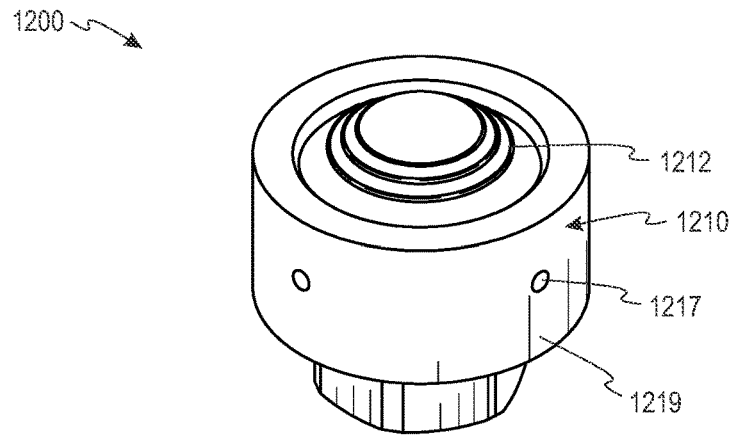
FIG. 12C is another perspective view of the fastener system of FIG. 12A.

Referring now to FIGS. 12A-12C, a fastener system 1200 is depicted according to another example embodiment. The fastener system 1200 is substantially similar to the fastener system 100 described above with respect to FIGS. 1-9. For example, the fastener system 1200 includes a washer 1210, a gasket 1212, a nut 1214, a retainer structure 1218, and a protective structure 1220 that are substantially similar and/or the same as the washer 110, the gasket 112, the nut 1214, the retainer structure 118, and the protective structure 120, respectively, described above with respect to FIGS. 1-9.

However, the fastener system 1200 differs from the fastener system 100 in that the nut 1214 includes an enlarged chamfer 1215. More specifically, as shown in FIG. 12, the nut 1214 includes a bore 1280 extending from a first end face 1274 of the nut 1214 to a second end face 1276 of the nut 1214. Additionally, as shown in FIG. 12A, the second end face 1276 of the nut 1214 engages a shoulder portion 1238 of the washer 1210. The bore 1280 of the nut 1214 includes the chamfer 1215 at the second end face 1276, and the chamfer 1215 is suitable to receive the gasket 1212 when the gasket 1212 is compressed against a structural element (e.g., the second structural element 1002B in FIGS. 10A-10E).

In this arrangement, the chamfer 1215 of the nut 1214 can facilitate deforming the gasket 1212 distally and into engagement with the threaded shaft 1004B of the bolt 1004. That is, the chamfer 1215 can provide a space into which the gasket 1212 can deform and provide a surface for guiding the gasket 1212 into engagement with the bolt 1004. This can help to enhance the seal between the gasket 1212 and the bolt 1004 in a passage 1222 of the fastener system 1200 and, thus, a seal in the apertures 1003A, 1003B of the first structural element 1002A and the second structural element 1002B in FIGS. 10A-10B.

Additionally, as shown in FIGS. 12A-12C, the washer 1210 can include one or more hold-assist features 1217 on an external surface 1219 of the washer 1210. For example, in FIG. 12, the hold-assist features 1217 include a plurality of holes that are configured to receive a tool such as, for example, a spanner wrench. In this arrangement, an operator can insert the tool (e.g., the spanner wrench) into one or more of the holes to facilitate holding the washer 1210 in a particular rotational position relative to the first structural element 1002A, the second structural element 1002B, and/or the bolt 1004 during the operations described above with respect to FIGS. 10A-10E.

In FIG. 12, the hold-assist features 1217 include the plurality of holes arranged in a common plane around a circumference of external surface 1219. However, the hold-assist features 1217 can be arranged differently on the external surface 1219 of the washer 1210 in other example embodiments.

In the examples described above, the fastener system 100, 1200 is configured to be assembled in a manner that allows for the components of the fastener system 100, 1200 to be retained in the washer 110, 1210. This can beneficially assist in facilitating handling and increase efficiency in coupling and decoupling the fastener system 100, 1200 to and from the bolt 1004 in operation. In turn, this can increase (or maximize) operational efficiencies and reduce a time to assemble, maintain, and/or repair a mill (or other system including the first structural element 1002A and the second structural element 1002B).

Figure 13A:
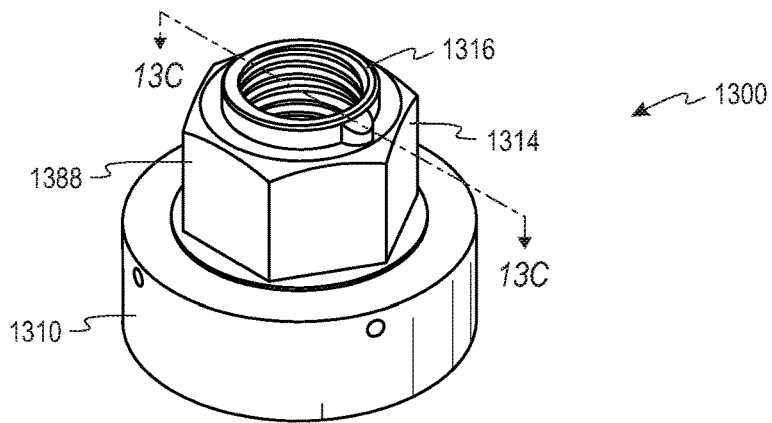
FIG. 13A is a perspective view of a fastener system according to another example embodiment.
Figure 13B:
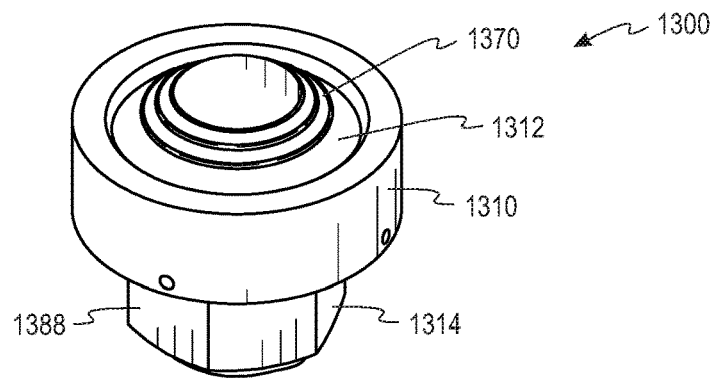
FIG. 13B is another perspective view of the fastener system of FIG. 13A.
Figure 13C:
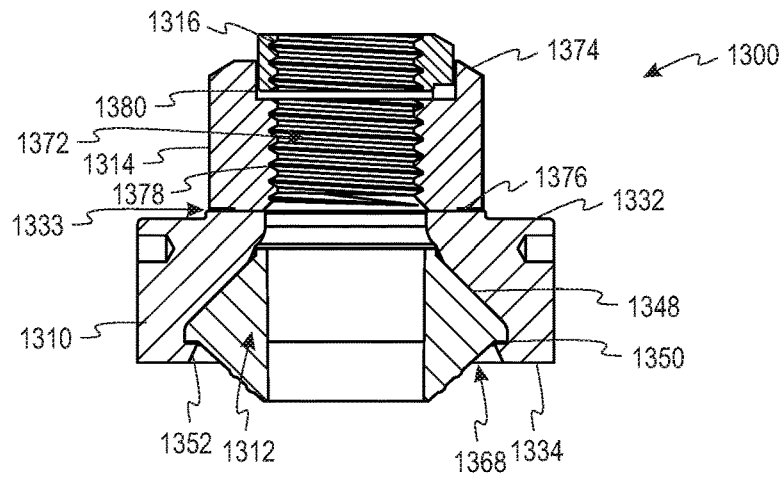
FIG. 13C is a cross-sectional view of the fastener system of FIG. 13A.

Although the fastener system 100, 1200 that can be assembled as a unit that is self-retaining can be beneficial, a modified version of the fastener system 100, 1200 can be configured such that one or more of the components described above are not retained in the washer 110, 1210. As an example, FIGS. 13A-13C depict a fastener system 1300 according to another example embodiment. In particular, FIG. 13A is a perspective view of the fastener system 1300, FIG. 13B is another perspective view of the fastener system 1300, and FIG. 13C is a cross-sectional view of the fastener system 1300.

Figure 14:
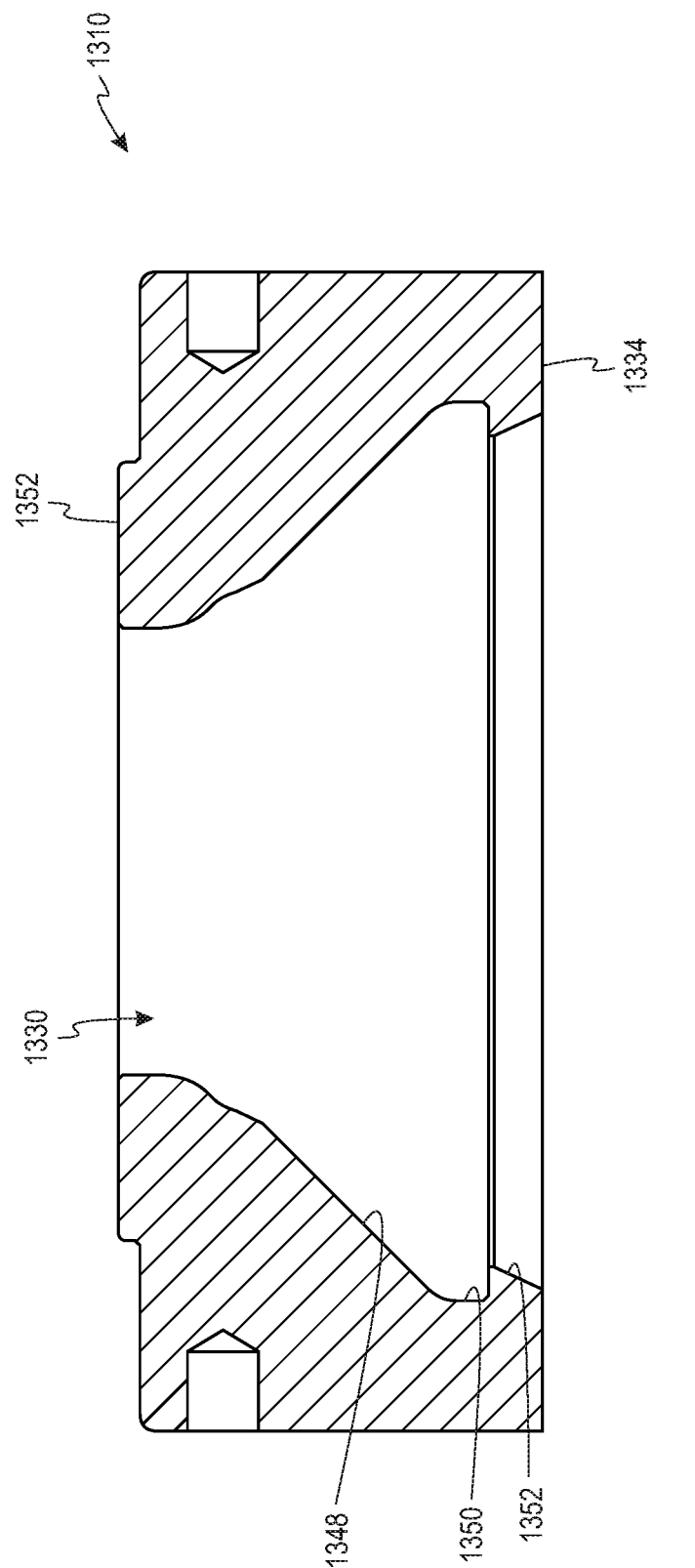
FIG. 14 is a cross-sectional view of a washer according to an example embodiment.

As shown in FIGS. 13A-13C, the fastener system 1300 includes a washer 1310, a gasket 1312, a nut 1314, and a lock ring 1316. FIG. 14 depicts a cross-sectional view of the washer 1310 in isolation. As shown in FIGS. 13A-13C and 14, the washer 1310 includes a bore 1330 extending from a distal end 1332 of the washer 1310 to a proximal end 1334 of the washer 110. Also, as shown in FIGS. 13A-13C and 14, the bore 1330 can include a first tapered wall 1348 extending outwardly from the distal end 1332 toward the proximal end 1334 of the washer 1310. Proximal of the first tapered wall 1348 is a flange section 1350, which extends inwardly to provide an engagement surface for axially retaining the gasket 1312.

The bore 1330 of the washer 1310 further includes a second tapered wall 1352 extending outwardly from the flange section 1350 to the proximal end 1334 of the washer 1310. Accordingly, in this arrangement, the flange section 1350 is between the first tapered wall 1348 and the second tapered wall 1352. Additionally, for example, the first tapered wall 1348 can define a first conical portion of the bore 1330, the flange section 1350 can define a generally cylindrical portion of the bore 1330, and the second tapered wall 1352 can define a second conical portion of the bore 1330.

Figure 15:
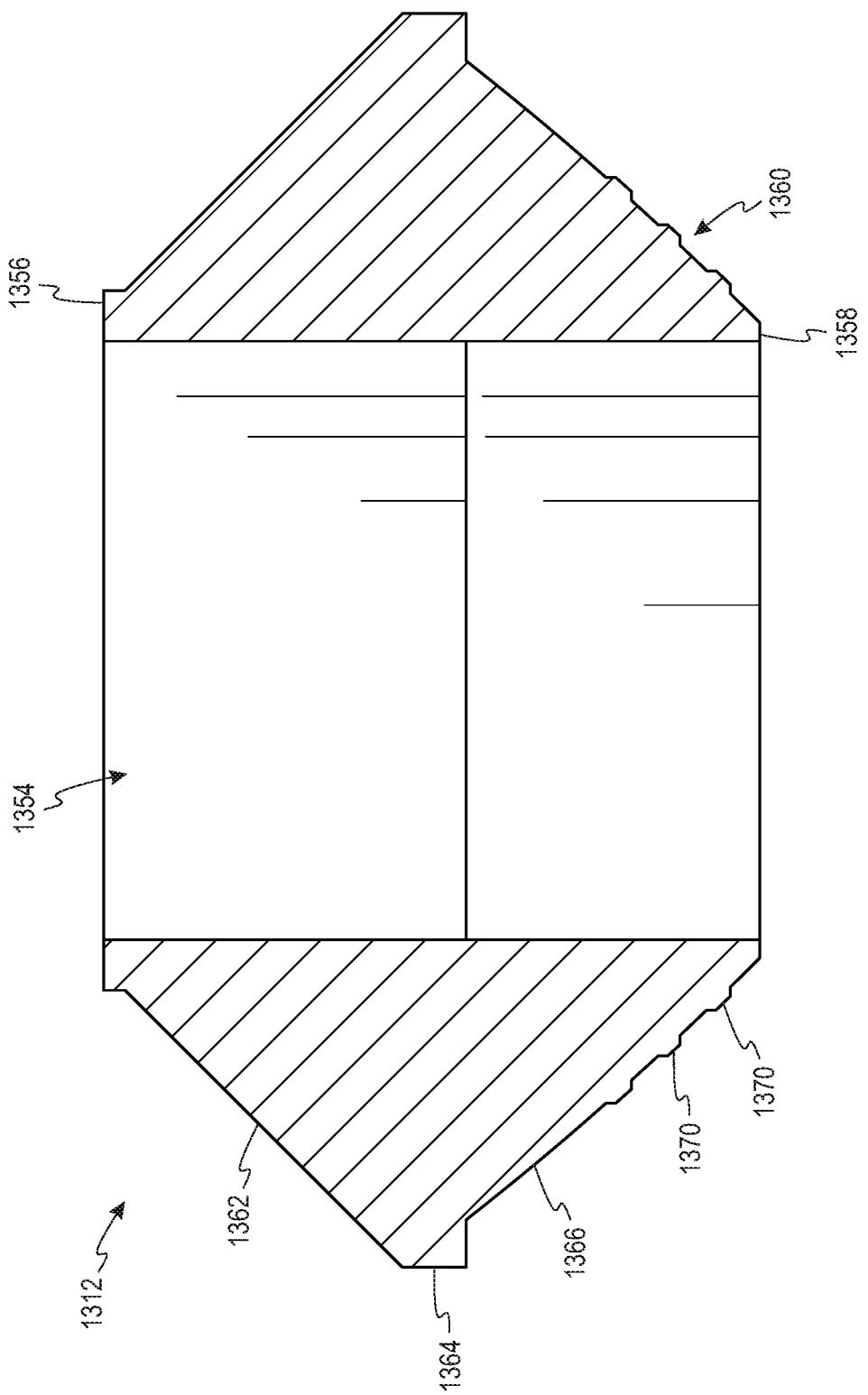
FIG. 15 is a cross-sectional view of a gasket according to an example embodiment.

As shown in FIG. 13C, the washer 1310 can receive and axially retain the gasket 1312 in the bore 1330. The gasket 1312 can be substantially similar and/or identical to the gasket 112 described above. FIG. 15 is a cross-sectional view of the gasket 1312 according to an example embodiment. As such, as described above, the gasket 1312 can include a through-bore 1354 that extends from a first end wall 1356 of the gasket 1312 to a second end wall 1358 of the gasket 1312. Additionally, as described above with respect to FIG. 6, the gasket 1312 can include an exterior surface 1360, which includes a distal portion 1362, a flange portion 1364, and a proximal portion 1366.

As shown in FIG. 13C and FIG. 15, the distal portion 1362 can have a surface profile with a contour that approximately matches a tapered contour of the first tapered wall 1348 in the bore 1330 of the washer 1310. Additionally, the flange portion 1364 can provide for axial retention of the gasket 1312 in the flange section 1350 in the bore 1330 of the washer 1310. As such, to couple the gasket 1312 to the washer 1310, the gasket 1312 can be deformed and inserted into the bore 1330 at the proximal end 1334 of the washer 1310, as described above. Once the flange portion 1364 of the gasket 1312 passes the flange section 1350 of the washer 1310, the gasket 1312 can return to a non-deformed (i.e., relaxed) shape as shown in FIG. 13C.

In this arrangement, the flange section 1350 of the washer 110 engages the flange portion 1364 of the gasket 1312 to axially retain the gasket 1312 in the bore 1330 of the washer 1310. As shown in FIG. 13C, when the gasket 1312 is received in the bore 1330 of the washer 1310, (i) the distal portion 1362 of the gasket 1312 can abut the first tapered wall 1348 and (ii) the first end wall 1356 of the gasket 1312 can be at or proximal to the distal end 1332 of the washer 1310.

As shown in FIG. 13C and FIG. 15, the proximal portion 1366 of the exterior surface 1360 tapers inwardly from the flange portion 1364 toward the second end wall 1358. As shown in FIG. 13C, a gap 1368 is formed between the proximal portion 1366 of the gasket 1312 and the second tapered wall 1352 of the washer 1310 when the gasket 1312 is received in the bore 1330 of the washer 1310. As described above, the gap 1368 can provide a space into which the gasket 1312 can deform when the fastener system 1300 engages a structural element (e.g., the second structural element 1002B) while coupled to a bolt (e.g., the bolt 1004).

As shown in FIGS. 13B-13C, the proximal portion 1366 of the gasket 1312 can extend beyond the proximal end 1334 of the washer 1310 when the gasket 1312 is coupled to the washer 1310 (and the fastener system 1300 is disengaged from a structural element). As shown in FIGS. 13B, 13C, and 15, the proximal portion 1366 can include one or more indicator markings 1370.

The nut 1314 includes a bore 1372 that extends from a first end face 1374 to a second end face 1376 of the nut 1314. The bore 1372 includes a threaded section 1378 and an unthreaded section 1380. The threaded section 1378 is proximal of the unthreaded section 1380 in the bore 1372. The threaded section 1378 can threadably engage with the threaded shaft 1004B of the bolt 1004. The unthreaded section 1380 can receive the lock ring 1316, as described above.

An outer surface 1382 of the nut 1314 includes a grip portion 1388. In FIGS. 13A-13C, the grip portion 1388 is hexagonal; however, the grip portion 1388 can have a different shape in other examples. In general, the grip portion 1388 can have a non-round shape that facilitates applying torque to the grip portion 1388 and/or resisting rotation of grip portion 1388 while torque is applied to a bolt (e.g., the bolt 1004) being coupled to the fastener system 1300.

As shown in FIGS. 13A-13C, the nut 1314 is arranged on the washer 1310 such that the second end face 1376 of the nut 1314 engages the distal end 1332 of the washer 1310. In FIG. 13C, the distal end 1332 of the washer 1310 includes a raised portion 1333, which is engaged with the second end face 1376 of the nut 1314. During use, the raised portion 1333 of the distal end 1332 of the washer 1310 may experience wear and tear. In an implementation, when the nut 1314 is decoupled from the washer 1310 (e.g., during maintenance and/or repair of a mill), the raised portion 1333 can be grinded so as to improve a condition of the distal end 1332 for engaging the second end face 1376 of the nut 1314 (without creating a recess in the distal end 1332 of the washer 1310).

Additionally, as shown in FIGS. 13A-13C, the bore 1372 of the nut 1314 is axially aligned with the bore 1330 of the washer 1310. In this arrangement, a bolt (e.g., the bolt 1004) can extend through the nut 1314 and the washer 1310.

Although the fastener systems 100, 1200 can provide a number of benefits associated with retaining the nut 114, 1214 in the washer 110, 1210 described above, the fastener system 1300 shown in FIGS. 13A-15 can be manufactured at reduced costs while retaining other benefits and advantages of the fastener systems 100, 1200 described above.

Figure 16:
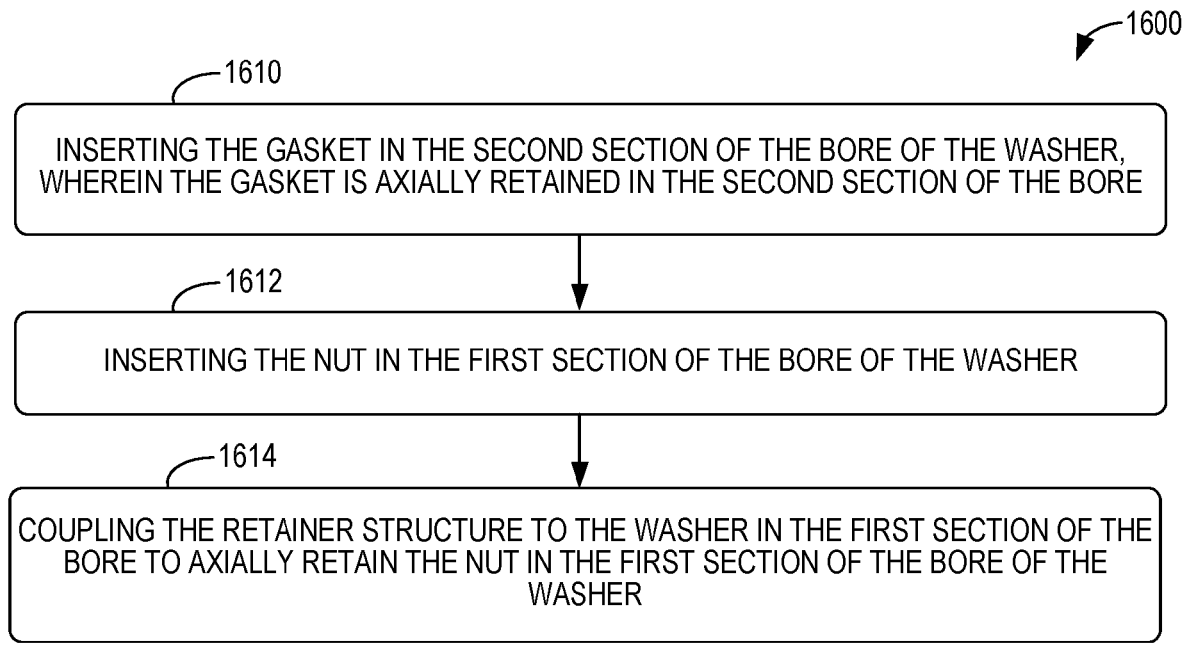
FIG. 16 is a flowchart of an example process for assembling a fastener system, according to an example embodiment.

Referring now to FIG. 16, a flow chart of an example process 1600 for assembling a fastener system is shown according to an example embodiment. The fastener system can include a washer, a nut, a retainer structure, and a gasket. The washer can include a bore extending between a distal end and a proximal end. A first section of the bore extends from the distal end to a shoulder portion. A second section of the bore extends from the shoulder portion to the proximal end.

As shown in FIG. 16, the process 1600 can include inserting the gasket in the second section of the bore of the washer at block 1610. The gasket is axially retained in the second section of the bore. At block 1612, the process 1600 can include inserting the nut in the first section of the bore of the washer. At block 1614, the process 1600 can include coupling the retainer structure to the washer in the first section of the bore to axially retain the nut in the first section of the bore of the washer.

Figure 17:
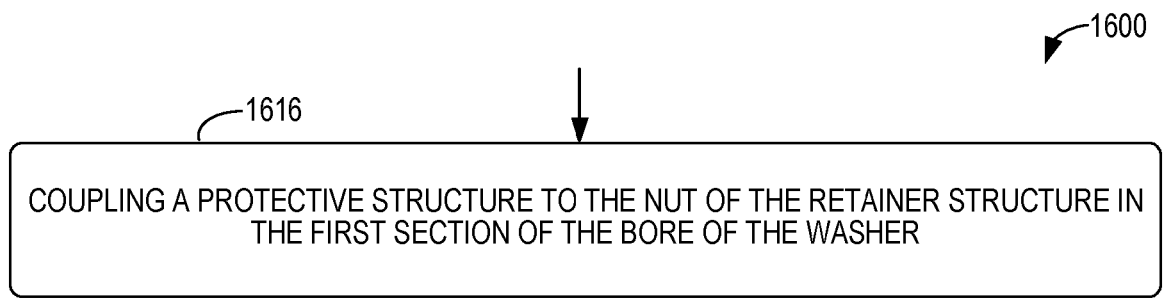
FIG. 17 is a flowchart of an example process for assembling a fastener system that can be used with process shown in FIG. 16.

FIGS. 17-20 depict additional aspects of the process 1600 according to further examples. As shown in FIG. 17, the process 1600 can also include coupling a protective structure to the nut of the retainer structure in the first section of the bore of the washer at block 1616. The protective structure is distal of the retainer structure, and the protective structure extends from the nut to a side wall of the washer.

Figure 18:
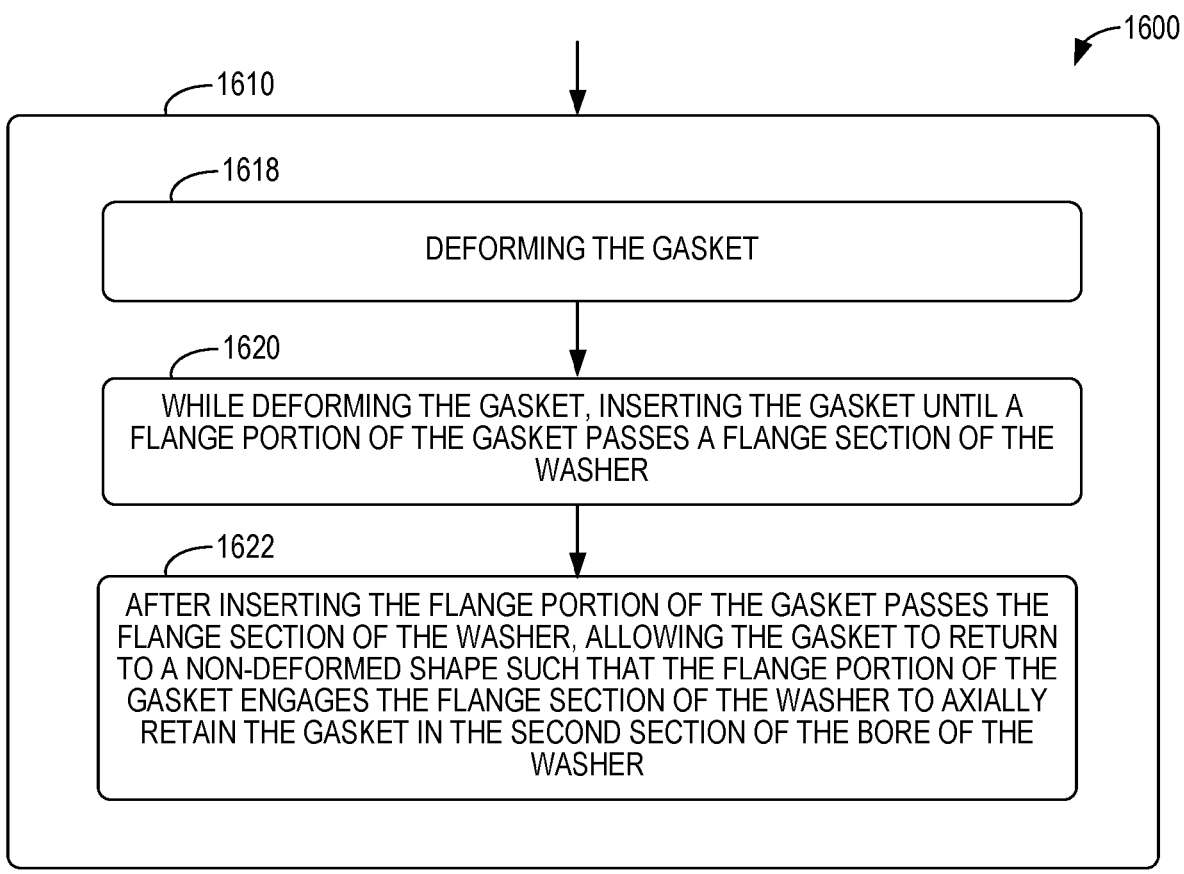
FIG. 18 is a flowchart of an example process for assembling a fastener system that can be used with process shown in FIG. 16.

As shown in FIG. 18, inserting the gasket at block 1610 can include deforming the gasket at block 1618. While deforming the gasket at block 1618, the process 1600 can include inserting the gasket until a flange portion of the gasket passes a flange section of the washer at block 1620. After inserting the flange portion of the gasket passes the flange section of the washer at block 1620, the process 1600 can include allowing the gasket to return to a non-deformed shape such that the flange portion of the gasket engages the flange section of the washer to axially retain the gasket in the second section of the bore of the washer at block 1622.

Figure 19:
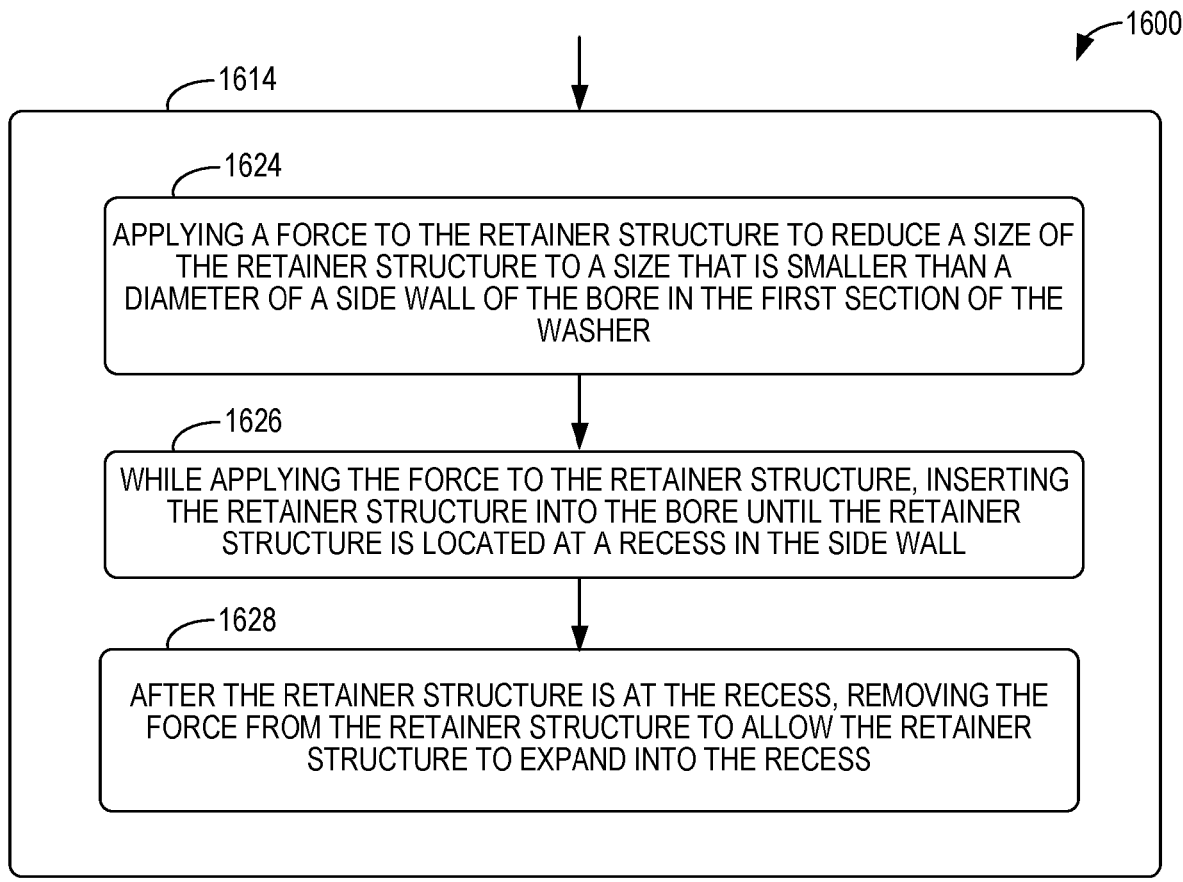
FIG. 19 is a flowchart of an example process for assembling a fastener system that can be used with process shown in FIG. 16.

As shown in FIG. 19, coupling the retainer structure to the washer at block 1614 can include applying a force to the retainer structure to reduce a size of the retainer structure to a size that is smaller than a diameter of a side wall of the bore in the first section of the washer at block 1624. While applying the force to the retainer structure at block 1624, the process 1600 can include inserting the retainer structure into the bore until the retainer structure is located at a recess in the side wall at block 1626. After the retainer structure is at the recess at block 1626, the process 1600 can include removing the force from the retainer structure to allow the retainer structure to expand into the recess at block 1628. The retainer structure is axially retained in the recess and extends inwardly from the side wall to provide an axial stop that limits movement of the nut in a distal direction.

Figure 20:
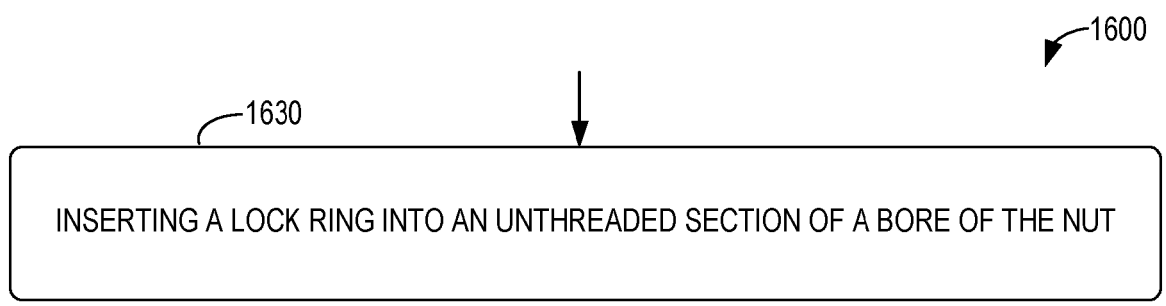
FIG. 20 is a flowchart of an example process for assembling a fastener system that can be used with process shown in FIG. 16.

As shown in FIG. 20, the process 1600 can also include inserting a lock ring into an unthreaded section of a bore of the nut at block 1630.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A fastener system comprising:
a washer having a bore extending between a distal end and a proximal end, wherein a first section of the bore extends from the distal end to a shoulder portion, wherein a second section of the bore extends from the shoulder portion to the proximal end, wherein the shoulder portion defines an aperture;
a nut configured to be received in the first section of the bore, wherein the nut comprises a threaded section configured to threadably engage a threaded shaft of a bolt;
a retainer structure configured to axially retain the nut in the first section of the bore of the washer; and
a gasket having a through-bore axially aligned with the bore of the washer and the threaded section of the nut, wherein the gasket is configured to be axially retained in the second section of the bore of the washer,
wherein the second section of the bore comprises:
a first tapered wall extending outwardly from the shoulder portion toward the proximal end of the washer,
a flange section proximal of the first tapered wall and extending inwardly from a proximal end of the first tapered wall to provide an engagement surface for axially retaining the gasket, and
a second tapered wall extending outwardly from the flange section to the proximal end of the washer such that the flange section is between the first tapered wall and the second tapered wall, and
wherein, at a position proximal of the proximal end of the washer, a gap is formed between a proximal portion of the gasket and the second tapered wall of the washer,
wherein the gasket is configured to deform into the gap when (i) the fastener system engages a structural element and (ii) the nut is engaged with the bolt.

2. The fastener system of claim 1, further comprising a protective structure configured to be received in the first section of the bore of the washer distal of the retainer structure, wherein the protective structure extends from the nut to a side wall of the washer.

3. The fastener system of claim 1, wherein the first section of the bore includes a side wall extending from the distal end of the washer to the shoulder portion, and
wherein the side wall comprises a recess that is suitable for retaining the retainer structure.

4. The fastener system of claim 1, wherein an exterior surface of the gasket comprises a distal portion, a flange portion, and the proximal portion,
wherein the distal portion of the exterior surface tapers outwardly from a first end wall of the gasket toward the flange portion,
wherein the proximal portion of the exterior surface tapers inwardly from the flange portion toward a second end wall of the gasket,
wherein the flange section of the washer engages the flange portion of the gasket to axially retain the gasket in the second section of the washer, and
wherein a diameter of the flange portion of the gasket is greater than a diameter of the flange section in the bore of the washer.

5. The fastener system of claim 4, wherein the distal portion has a surface profile with a contour that approximately matches a tapered contour of the first tapered wall in the second section of the washer.

6. The fastener system of claim 4, wherein the distal portion of the gasket abuts the first tapered wall in the second section of the washer.

7. The fastener system of claim 6, wherein the first end wall of the gasket is at the shoulder portion of the washer.

8. The fastener system of claim 4, wherein the proximal portion of the gasket extends beyond the proximal end of the washer.

9. The fastener system of claim 4, wherein the proximal portion of the gasket comprises one or more indicator markings that indicate a size of the gasket.

10. The fastener system of claim 1, wherein the nut extends from a first end face to a second end face,
wherein the shoulder portion limits axial movement of the nut in a proximal direction, and
wherein the shoulder portion of the washer and the second end face of the nut are generally flat surfaces, which are substantially perpendicular to an axis of the bore.

11. The fastener system of claim 1, wherein the nut comprises a bore extending from a first end face of the nut to a second end face of the nut,
wherein the second end face engages the shoulder portion of the washer, and
wherein the bore of the nut comprises a chamfer at the second end face, and
wherein the chamfer is suitable to receive the gasket when the gasket is compressed against a structural element.

12. The fastener system of claim 1, further comprising a lock ring,
wherein the nut further comprises an unthreaded section that is configured to receive a lock ring, and
wherein the lock ring comprises a threaded inner wall and an outer surface having a lug, and
wherein the lug is configured to rotatably lock the lock ring to the nut.

13. The fastener system of claim 1, wherein the nut is rotatable relative to the washer when the nut is received in the first section of the bore of the washer.

14. The fastener system of claim 1, wherein the nut comprises an outer surface including a grip portion, which has a non-round shape.

15. The fastener system of claim 1, wherein the retainer structure is a retaining ring.

16. The fastener system of claim 1, wherein a dwell is formed between the shoulder portion of the washer and the retainer structure, and
wherein the nut can move axially within the dwell.

17. The fastener system of claim 1, wherein the gasket and the gap are configured such that the gasket does not protrude proximally from the proximal end of the washer when (i) the fastener system engages a structural element and (ii) the nut is engaged with a bolt.

18. A method of assembling a fastener system, wherein the fastener system comprises a washer, a nut, a retainer structure, and a gasket, wherein the washer comprises a bore extending between a distal end and a proximal end, wherein a first section of the bore extends from the distal end to a shoulder portion, wherein a second section of the bore extends from the shoulder portion to the proximal end, the method comprising:
inserting the gasket in the second section of the bore of the washer, wherein the gasket is axially retained in the second section of the bore;
inserting the nut in the first section of the bore of the washer; and
coupling the retainer structure to the washer in the first section of the bore to axially retain the nut in the first section of the bore of the washer,
wherein the second section of the bore comprises:
a first tapered wall extending outwardly from the shoulder portion toward the proximal end of the washer,
a flange section proximal of the first tapered wall and extending inwardly from a proximal end of the first tapered wall to provide an engagement surface for axially retaining the gasket, and
a second tapered wall extending outwardly from the flange section to the proximal end of the washer such that the flange section is between the first tapered wall and the second tapered wall, and
wherein, at a position proximal of the proximal end of the washer, a gap is formed between a proximal portion of the gasket and the second tapered wall of the washer after the gasket is inserted in the second section of the bore of the washer,
wherein the gasket is configured to deform into the gap when (i) the fastener system engages a structural element and (ii) the nut is engaged with a bolt.

19. The method of claim 18, further comprising coupling a protective structure to the nut of the retainer structure in the first section of the bore of the washer, wherein the protective structure is distal of the retainer structure, wherein the protective structure extends from the nut to a side wall of the washer.

20. The method of claim 18, wherein inserting the gasket comprises:
deforming the gasket;
while deforming the gasket, inserting the gasket until a flange portion of the gasket passes a flange section of the washer, wherein a diameter of the flange portion of the gasket is greater than a diameter of the flange section in the bore of the washer;
after inserting the flange portion of the gasket passes the flange section of the washer, allowing the gasket to return to a non-deformed shape such that the flange portion of the gasket engages the flange section of the washer to axially retain the gasket in the second section of the bore of the washer.

21. The method of claim 18, wherein coupling the retainer structure to the washer comprises:
applying a force to the retainer structure to reduce a size of the retainer structure to a size that is smaller than a diameter of a side wall of the bore in the first section of the washer;
while applying the force to the retainer structure, inserting the retainer structure into the bore until the retainer structure is located at a recess in the side wall; and
after the retainer structure is at the recess, removing the force from the retainer structure to allow the retainer structure to expand into the recess,
wherein the retainer structure is axially retained in the recess and extends inwardly from the side wall to provide an axial stop that limits movement of the nut in a distal direction.

22. The method of claim 18, further comprising inserting a lock ring into an unthreaded section of a bore of the nut.

23. The method of claim 18, wherein the structural element comprises:
a first structural element with a first aperture, and
a second structural element with a second aperture,
wherein the method further comprises:
positioning the first structural element and the second structural element such that the
first aperture is aligned with the second aperture,
inserting the bolt through the first aperture and the second aperture,
receiving a threaded shaft of the bolt to a threaded section in a bore of the nut,
rotating the bolt relative to the nut to cause the gasket to contact an exterior
surface of the structural element,
responsive to rotating the bolt relative to the nut, applying a force between the
gasket and the exterior surface of the structural element to deform the gasket into the gap such that the gasket does not protrude proximally from the proximal end of the washer.

24. A fastener system comprising:
a washer having a bore extending between a distal end and a proximal end, wherein a first section of the bore extends from the distal end to a shoulder portion, wherein a second section of the bore extends from the shoulder portion to the proximal end;
a gasket having a through-bore axially aligned with the bore of the washer, wherein the gasket is configured to be axially retained in the bore of the washer;
a nut comprising bore having a threaded section and an unthreaded section, wherein the threaded section is configured to threadably engage a threaded shaft of a bolt; and
a lock ring in the unthreaded section of the nut, wherein the lock ring comprises a threaded inner wall and an outer surface having a lug, wherein the lug is configured to rotatably lock the lock ring to the nut,
wherein the second section of the bore comprises:
  a first tapered wall extending outwardly from the shoulder portion toward the proximal end of the washer,
  a flange section proximal of the first tapered wall and extending inwardly to provide an engagement surface for axially retaining the gasket, and
  a second tapered wall extending outwardly from the flange section to the proximal end of the washer such that the flange section is between the first tapered wall and the second tapered wall, and
wherein, at a position proximal of the proximal end of the washer, a gap is formed between a proximal portion of the gasket and the second tapered wall of the washer,
wherein the gasket is configured to deform into the gap when (i) the fastener system engages a structural element and (ii) the nut is engaged with the bolt.

* * * * *